(12) United States Patent
Chang et al.

(10) Patent No.: US 10,376,807 B2
(45) Date of Patent: *Aug. 13, 2019

(54) METHODS AND APPARATUSES FOR WATER PURIFICATION

(71) Applicants: Huei Meng Chang, Milpitas, CA (US); Yee Chun Lee, Milpitas, CA (US); Narayan D. Raju, Milpitas, CA (US)

(72) Inventors: Huei Meng Chang, Milpitas, CA (US); Yee Chun Lee, Milpitas, CA (US); Narayan D. Raju, Milpitas, CA (US)

(73) Assignee: Huei Meng Chang, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/159,639

(22) Filed: Oct. 13, 2018

(65) Prior Publication Data

US 2019/0060778 A1    Feb. 28, 2019

Related U.S. Application Data

(63) Continuation-in-part of application No. 13/733,842, filed on Jan. 3, 2013, now Pat. No. 10,118,835.

(51) Int. Cl.
| | |
|---|---|
| *B01D 1/04* | (2006.01) |
| *B01D 5/00* | (2006.01) |
| *B01D 1/28* | (2006.01) |
| *C02F 1/04* | (2006.01) |

(Continued)

(52) U.S. Cl.
CPC .............. *B01D 1/0011* (2013.01); *B01D 1/28* (2013.01); *B01D 1/305* (2013.01); *B01D 5/006* (2013.01);

(Continued)

(58) Field of Classification Search
CPC .......... B01D 1/01; B01D 1/014; B01D 1/017; B01D 1/04; B01D 1/06; B01D 1/08;
(Continued)

(56) References Cited

U.S. PATENT DOCUMENTS 4,235,281 A * 11/1980 Fitch ...................... B01D 1/065
165/115
4,693,091 A * 9/1987 O'Mara .................. F24F 13/22
137/59

(Continued)

*Primary Examiner* — Jonathan Miller
*Assistant Examiner* — Jonathan Luke Pilcher

(57) ABSTRACT

An apparatus for generating purified liquid from an input liquid, comprises, an evaporation chamber flooded with the input liquid and wherein the evaporation chamber generates saturated gases and comprises a shared wall with the condensation chamber and wherein the evaporation chamber is configured to generate evaporation cavities and condensation cavities on respective sides of the shared wall for a 2-phase counter flow of a liquid phase component and a gaseous phase component in composite flows for a 2-phase to 2-phase direct latent heat exchange. A condensation chamber has channels disposed in the input liquid, wherein liquid-saturated gases are generated therefrom in the evaporation chamber. The apparatus is operated as a four-port counter-flow heat exchanger where two different fluids are exchanging heat based on the inlet ports of both fluids being on opposite sides and the outlet ports of both fluids are also on opposite sides of the evaporator and condenser.

19 Claims, 22 Drawing Sheets

(51) Int. Cl.
*B01D 1/00* (2006.01)
*B01D 1/30* (2006.01)
*B01D 21/00* (2006.01)
*B03C 3/017* (2006.01)
*B01L 1/04* (2006.01)

(52) U.S. Cl.
CPC ......... *B01D 5/0015* (2013.01); *B01D 5/0039* (2013.01); *B01D 21/0018* (2013.01); *B03C 3/017* (2013.01); *C02F 1/041* (2013.01); *C02F 1/043* (2013.01); *B01L 1/04* (2013.01); *C02F 2201/002* (2013.01); *C02F 2303/10* (2013.01)

(58) Field of Classification Search
CPC . B01D 1/10; B01D 1/12; B01D 1/221; B01D 1/28; B01D 1/2803; B01D 1/2806; B01D 1/2809; B01D 1/2012; B01D 1/2818; B01D 1/284; B01D 1/2843; B01D 1/285; F28D 1/0246; F28D 1/0308; F28D 1/0025; C02F 1/04; C02F 1/043; C02F 1/041
USPC ....................................... 159/24.1
See application file for complete search history.

(56) References Cited

U.S. PATENT DOCUMENTS

| | | | | |
|---|---|---|---|---|
| 5,564,693 A * | 10/1996 | Elkis | ................... | B65H 5/224 198/689.1 |
| 5,575,889 A * | 11/1996 | Rosenblad | ............. | B01D 1/228 159/13.3 |
| 5,645,694 A * | 7/1997 | Stewart | ................... | B01D 1/04 159/24.1 |
| 5,772,850 A * | 6/1998 | Morris | ................... | B01D 1/12 159/24.2 |
| 5,814,192 A * | 9/1998 | Pittmon | ................... | B01D 1/28 159/28.6 |
| 6,911,121 B1 * | 6/2005 | Beckman | ................. | B01D 1/22 159/13.1 |
| 7,431,805 B2 * | 10/2008 | Beckman | ................. | B01D 1/22 202/155 |
| 10,118,835 B2 * | 11/2018 | Lee | ......................... | B01D 1/04 |
| 2003/0132095 A1 * | 7/2003 | Kenet | ................... | B01D 1/28 202/182 |
| 2010/0270011 A1 * | 10/2010 | Takahashi | ............ | F28D 7/0025 165/148 |

* cited by examiner

METHODS AND APPARATUSES FOR WATER PURIFICATION

CROSS REFERENCE

This application claims priority from a provisional patent application entitled "Method and Apparatus for Water Purification" filed on Jan. 11, 2012, having an Application No. 61/585,293, and from a provisional patent application entitled "Methods and Apparatuses for Water Purification" filed on Nov. 16, 2012, having an Application No. 61/727,661. Said applications are incorporated herein by reference. This application is also Continuation in Part (CIP) of and claims priority to earlier filed U.S. Non-Provisional patent application Ser. No. 13/733,842 filed Jan. 3, 2013 in allowance for issue and is incorporated herein by reference in its entirety, including all amendments thereof.

FIELD OF INVENTION

This invention generally relates to methods and apparatuses for water purification, and, in particular, to methods and apparatuses for water purification using humidification-dehumidification ("HDH").

BACKGROUND

Lack of clean drinking water is still the primary cause for disease, suffering and ultimately death in many parts of the world. Even where water is available to the public, often times the available water is contaminated by chemicals used in agriculture, e.g., by industrial contamination or by sewage seeping into the water supply. Additionally, areas in close proximity to an ocean have a water source of high salinity, and consequently not suitable for drinking.

Water that is centrally treated is also not safe in many parts of the world as positive pressure is not maintained at all times in the distribution network for the water. Leaks in the distribution network can cause contamination of the water in this system. Furthermore, the multiple points where the water is stored after an initial treatment, e.g., storage tanks, lack any kind of continuous supervision and sanitation. In particular, storage tanks are not cleaned regularly, thereby becoming sources of contamination and having an ecosystem of their own with all sorts of insects, animals, bacterial growth, and algal growth.

The use of bottled water has grown in metropolitan cities. However, in rural areas, this is not possible, nor desired, since transportation of the bottled water to the end users is often difficult and since the indiscriminate use of plastics for the bottled water has caused a disposal and recycling nightmare.

In effort to solve such dilemmas with existing water supplies, there have been extensive efforts in the field of filtration to purify water sources. Existing technologies for filtration require the use of continuously replaceable consumables having multiple stages of filters to maintain the system in optimal state. Once these consumables are not replaced due to neglect or non-availability, the quality of the output water (otherwise referred to as product water) from these systems is severely degraded and in many cases becomes worse than the actual input water due to internal contamination.

There are two general classes of water purification technologies: one is based on the principle of evaporation and condensation, or thermal distillation, and the other is based on membrane filtration. Among membrane filtration techniques, reverse osmosis ("RO") and electro-dialysis are the most representative. For thermal distillation, there are various vacuum thermal desalination techniques available for large, high capacity plants, as well as atmospheric distillation techniques, also called HDH, which are more suited for small purification devices.

The rapid advances of the RO based technologies in recent years have made RO the favorite among all water purification technologies owing to its low initial capital costs and high energy efficiencies. For seawater desalination, the specific energy cost of RO (when energy recovery is used) is between 4 to 7 kWh/ton of purified water, while most large thermal desalination plants which use MSF (multiple stage flash evaporation) and MED (multiple effects evaporation distillation) have specific energy expenditure between 20 to 200 kWh/ton. The HDH systems fare even worse in this respect with a specific energy cost ranging from 150 kWh/ton to more than 400 kWh/ton. The sole exception to this comparison is mechanical vapor compression ("MVC") which can achieve a specific energy consumption level comparable to that of RO, with a range from 4 kWh/ton to just below 12 kWh/ton).

However, thermal distillation generally produces highly purified water with a TDS (total dissolved solid) level well below 1 ppm (part per million), while it would be impractical for RO plants to produce water purity of less than 20 ppm or so. RO is also unable to filter out light weight dissolved chemical molecules if their sizes are comparable to the average pore size of the RO membrane. RO is also far more prone to fouling, scaling, and plugging of the membrane, and rapid oxidation can easily destroy the membrane if it is directly exposed to air. While all water purification techniques require pretreatments or pre-filtering to reduce the probability of fouling and to ensure proper operation of the main purification process, RO typically requires more pretreatments to protect its membranes from failures, and the standard half-life of an RO membrane is about two years, hence the costs of its consumables represent a large part of its total operational cost.

The low initial cost advantage of RO lies primarily in its exceptional packing density, or area to volume ratio. While thermal distillation relies on heat exchange surfaces to reclaim latent heat in order to lower its energy cost, RO and other membrane techniques rely on large filtration surface to separate clean water from brine, hence packing density plays a very important role in both classes of purification technologies. Having a large surface area not only can increase water production, but also can reduce the surface loading factor, which is the rate of purified water production per unit surface area. Reducing surface loading can drastically improve operational efficiency at the cost of reducing water production rate since it greatly reduces internal entropy productions in both RO systems and thermal distillation plants.

Although MVC thermal distillation technology has largely caught up to RO in terms of specific energy cost, its initial capital cost is still far higher than comparable RO technologies owing to its much lower packing density. HDH systems are typically lower in costs than RO and have the potential of producing purer water than RO because of its low temperature atmospheric pressure operations. However, the extremely low specific energy efficiencies of these systems have been the main obstacles to their wide acceptance.

Another drawback is that existing distillation technologies are far too costly to implement since these technologies use a large amount of energy to convert water to steam before recondensing the saturated gases and since these technologies are typically built with expensive stainless steel or other costly metals.

One of the major disadvantages of the existing distillation techniques is the requirement to employ high strength materials for the containment and heat exchange walls. HDH partially solves the problem by using atmospheric pressure evaporation (humidification) and condensation (dehumidification) which obviates the need to utilize high strength materials and replace them with cheaper and thinner materials such as plastic substrates.

Another disadvantage of the existing distillation techniques is the comparatively low packing density, or surface to volume ratio of the heat exchange surfaces. By way of example, spiral wound filters and hollow tube RO filters have packing densities which are orders of magnitude higher and permit smaller filtration plants to be built for the same capacity. Higher packing density in the case of distillation plants could also mean lower loading on the heat exchange surfaces for the same water production capacity, which drastically improves latent heat recovery efficiency while maintaining the same water production capacity.

Still another disadvantage for some of the existing distillation techniques is the lack of a direct heat exchange in both the evaporator and the condenser. Typically both the evaporator and the condenser have cross flows to exchange heat in a conventional manner but this does not bring about any novel and efficient advantages.

FIG. 1 illustrates a diagram of a prior art method and apparatus for water purification using HDH. The prior art comprises a vertical heat exchange wall 10 between the evaporation chamber 12 and the condensation chamber 14. Feed water 16 is sprayed downward, near the top of the evaporation chamber 12, via a sprayer 18. An air blower 20 blows against a falling mist 28 of the feed water from the bottom of the evaporation chamber 12. There is also a brine tray 22 at the bottom of the evaporation chamber 12 for storing concentrated brine 24, the remnants of the feed water that did not evaporate. The brine 24 in the brine tray 22 can be removed via a brine outlet 26 of the evaporation chamber 12. The vertical heat exchange wall 10 allows latent heat from the condensation chamber 14 to flow to the evaporation chamber 12 (see dotted arrows for that general direction). As a portion of the feed water 16 evaporates, the saturated gases are directed to the condensation chamber 14. The condensation chamber 14 then condenses the saturated gases and produces product water 30. The product water 30 is pooled and directed out of the condensation chamber via an outlet 34 for storage or use. The non-condensed gases are directed out of the condensation chamber 14 via an air outlet 32 near the bottom of the condensation chamber 14 in an open loop process. Since the latent heat exchange process does not fully recover the latent heat for reuse, an additional heat source in the form of a heater 36 is required to introduce further steam into the condensation chamber 14 and to preheat the feed water.

By placing the condensation chamber 12 side by side with the evaporation chamber 14, separated only by a common wall 10 which serves as the heat exchange wall, the latent heat generated from the condensation of the water vapor is transferred to the evaporator to heat the feed water, which eliminates one of the major drawbacks of the HDH distillation process.

Unfortunately, due to the design of the prior art, several inefficiencies are apparent. First, the vertical heat exchange wall 10 is not fully utilized since most of the latent heat transfer is inefficiently transferred from gases in the condensation chamber 14 to other gases in the evaporation chamber 12. This is due to the vertical arrangement of the heat exchange wall 10 and due to the misting of feed water 16 downwards into the evaporation chamber 12.

In a vertical heat exchange wall arrangement, filmwise condensation, first studied by Nusselt, is generally recognized as being a more efficient condensation mechanism as the latent heat released at the outer boundary of the liquid film condensate is transferred directly to the heat exchange surface without going through gases. However, in order for this to occur, the heat exchange surface must have a strong affinity to said liquid, i.e., the surface must be strongly hydrophilic. This is not the case with the prior art with its plastic heat exchange surface. The low affinity (wettability) of the plastic heat exchange surface to liquid makes it hard for the condensing liquid on the condenser side to form filmwise or dropwise condensation, and to form filmwise evaporation on the evaporator side; this drastically reduces the heat transfer efficiency and lowers the fraction of the latent heat that can be recovered.

Lower latent heat exchange performance increases internal entropy production. As will be clear below, any increase in internal entropy production decreases total system efficiency and/or reduces water production rate. Since mechanical work does not introduce additional entropy flow into the system, it is preferred over direct heat input in general cases. However, when the input heat is derived from waste heat or other low cost heat sources, it might be more preferable to use those heat sources as the input instead of mechanical work input despite the latter's more efficient utilization of the energy.

In addition, the open loop process does not reuse the sensible heat that still remains within the non-condensed gasses that are routed via the air outlet 32 from being reused. Although rerouting the non-condensed gases to the bottom of the evaporation chamber can recoup some of the waste heat, such a process is inherently inefficient owing to the large temperature difference between the non-condensed gas and the feed water. The evaporation chamber 12 also requires a large volume to generate any appreciable amount of product water owing to the relatively low surface to volume ratio of the prior art design.

Another main drawback of said prior art is its use of hot steam injection to provide the needed heat input for evaporation. As will be explained in a great deal more detail below, any direct heat input through hot fluid injection or direct heating of the system introduces a continuous stream of entropy into the system which must be ejected in order to keep the total entropy within the system finite. Such entropy ejection leads to increased energy consumption which decreases the overall system efficiency and/or production rate.

Therefore, it is desirable to present novel methods, systems and apparatuses for filtration that addresses all of the above drawbacks.

SUMMARY OF INVENTION

An object of this invention is to provide an apparatus and system using HDH that permits efficient direct latent heat transfer in a cost effective manner via a bulk/percolating immersion evaporation and closed-loop air recirculation system using atmospheric pressure distillation. The disclosed apparatus generates purified liquid from an input liquid and includes an evaporation chamber flooded with the input liquid and wherein the evaporation chamber generates saturated gases and comprises a shared wall with the condensation chamber and wherein the evaporation chamber is configured to generate evaporation cavities and condensation cavities on respective sides of the shared wall for a 2-phase counter flow of a liquid phase component and a gaseous phase component in composite flows for a 2-phase to 2-phase direct latent heat exchange. A condensation chamber has channels disposed in the input liquid, wherein liquid-saturated gases are generated therefrom in the evaporation chamber. The apparatus is operated as a four-port counter-flow heat exchanger where two different fluids are exchanging heat based on the inlet ports of both fluids being on opposite sides and the outlet ports of both fluids are also on opposite sides of the evaporator and condenser.

Another object of this invention is to provide a filtration apparatus wherein a plurality of evaporation chambers and condensation chambers are placed to provide a large overall latent heat exchange surface to ensure low loading factor for said exchange surface for enhanced latent heat recapturing performance even at high water production rates.

Yet another object of this invention is to provide a filtration apparatus which utilizes dropwise condensation and a percolating flooded evaporation chamber to enhance latent heat exchange performance.

A further object of this invention is to provide a filtration system where capillary force is employed within an aerodynamically efficient screen to prevent entrained liquid droplets from entering the compressor chamber and to reduce the pressure drop of the mist retaining screen due to the drag force exerted on the gas flow by the screen.

Even more so, another object of this invention is to provide a system with an impermeable hollow fiber heat exchange matrix which combines evaporation and condensation chambers into a single fabric to rival other filtration systems in packing density (active surface area to volume ratio), e.g., the spiral wound and semi-permeable hollow fiber membranes for a reverse osmosis filtration system.

Yet still another object of this invention is to provide an apparatus with enhanced brine sedimentation means to keep the brine concentration in the evaporation chambers to a controlled level.

Yet still, another object of the invention is to provide a filtration system with electrical gas filtration for the recirculating incondensable carrier gases to remove contaminated suspended particulates and liquid droplets from the input gas stream to the condensation chambers.

It is yet another object of the present invention to provide a filtration system with self-monitoring capabilities with distributed sensors and actuators for the purpose of predicting and estimating the internal entropy production rate, and steering the system toward optimal performances based on such real-time sensor inputs.

It is a further object of the present invention to provide a filtration system with the ability to switch amongst a multitude of energy sources in order to minimize operational costs.

It is still another object of this invention to provide a filtration system with polymer heat exchange substrates with improved anisotropic bulk thermal conductivity and higher mechanical strength for the purpose of enhancing the latent heat transfer characteristics of said polymer substrates.

Other objects and advantages of the present invention shall become apparent to those skilled in the art by referencing to the remaining portions of the specifications together with their respective drawings.

Briefly, the present invention discloses an apparatus for generating purified liquid from an input liquid, comprising, an evaporation chamber, wherein the evaporation chamber is flooded with the input liquid; and a condensation chamber having channels, wherein the channels are disposed in the input liquid, wherein liquid-saturated gases are generated from the input liquid in the evaporation chamber, wherein the liquid-saturated gases are guided into a first end of the channels, and wherein the purified liquid is outputted at a second end of the channels.

An advantage of this invention is that low cost methods and apparatuses for water purification are provided.

Another advantage of this invention is that low energy methods and apparatuses for water purification are provided.

Yet another advantage of this invention is that energy efficient methods and apparatuses for water purification are provided.

Still another advantage of this invention is that the produced water quality remains high and consistent.

A further advantage of this invention is the ability of the present system to self-monitor the states of the system operation and automatically retune said system toward optimum performances.

A still further advantage of this invention is that a plurality of energy sources can be utilized and switched amongst them to provide near optimum operational conditions in real-time.

DESCRIPTION OF THE DRAWINGS

The foregoing and other objects, aspects, and advantages of the invention can be better understood from the following detailed description of the preferred embodiment of the invention when taken in conjunction with the accompanying drawings in which.

DETAILED DESCRIPTION OF THE PREFERRED EMBODIMENTS

In the following detailed description of the embodiments, reference is made to the accompanying drawings, which form a part hereof, and in which is shown by way of illustration of specific embodiments in which the present invention may be practiced.

The below description described the invention in relation to purifying dirty water. However, it is understood that the present invention can be applied for purifying a host of other liquids, including saline water, contaminated water, or other liquids.

The present invention overcomes many deficiencies of the current art by using the minimum entropy production principle to maximize latent heat exchange efficiencies and by increasing the packing density of the heat exchange surfaces. Additionally, the present invention provides real-time adaptive control of the system operation to continuously retune the system parameters as well as switching to alternate energy source to maintain low operational costs.

Figure 1:
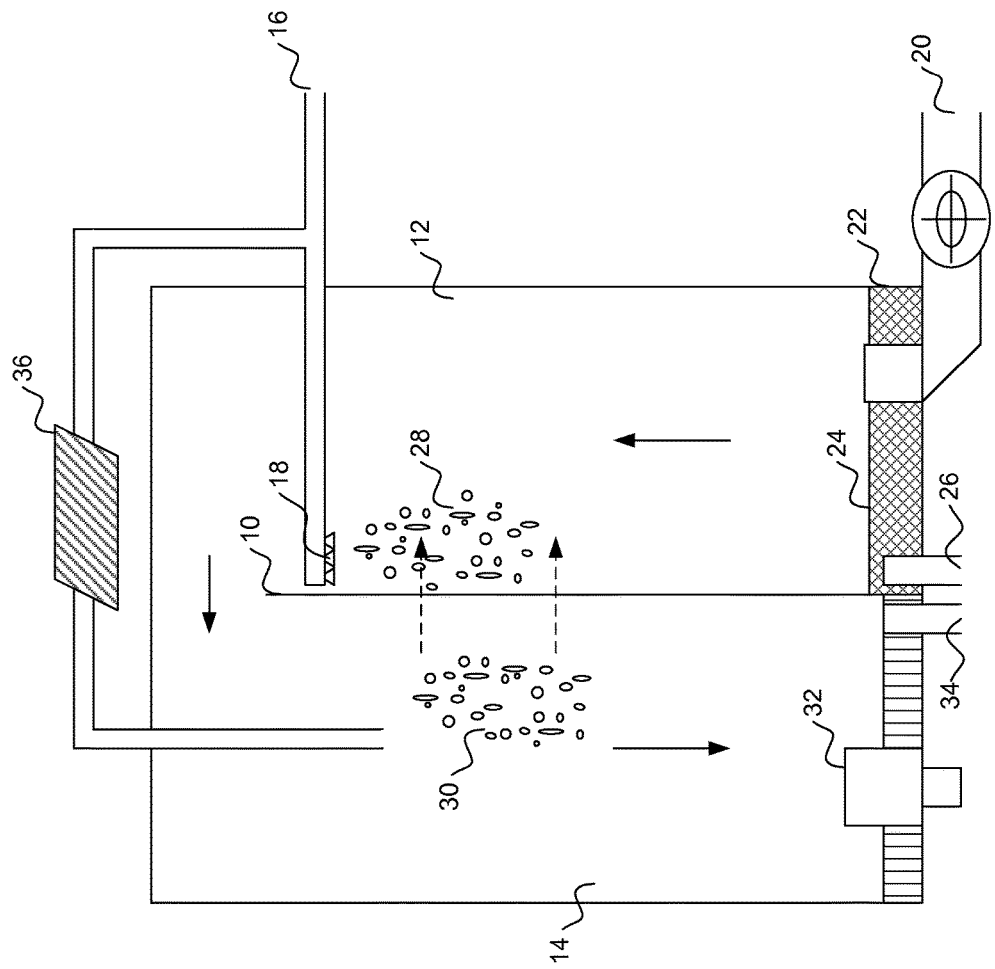
FIG. 1 illustrates a diagram of a prior art method and apparatus for water purification using HDH.
Figure 2A:
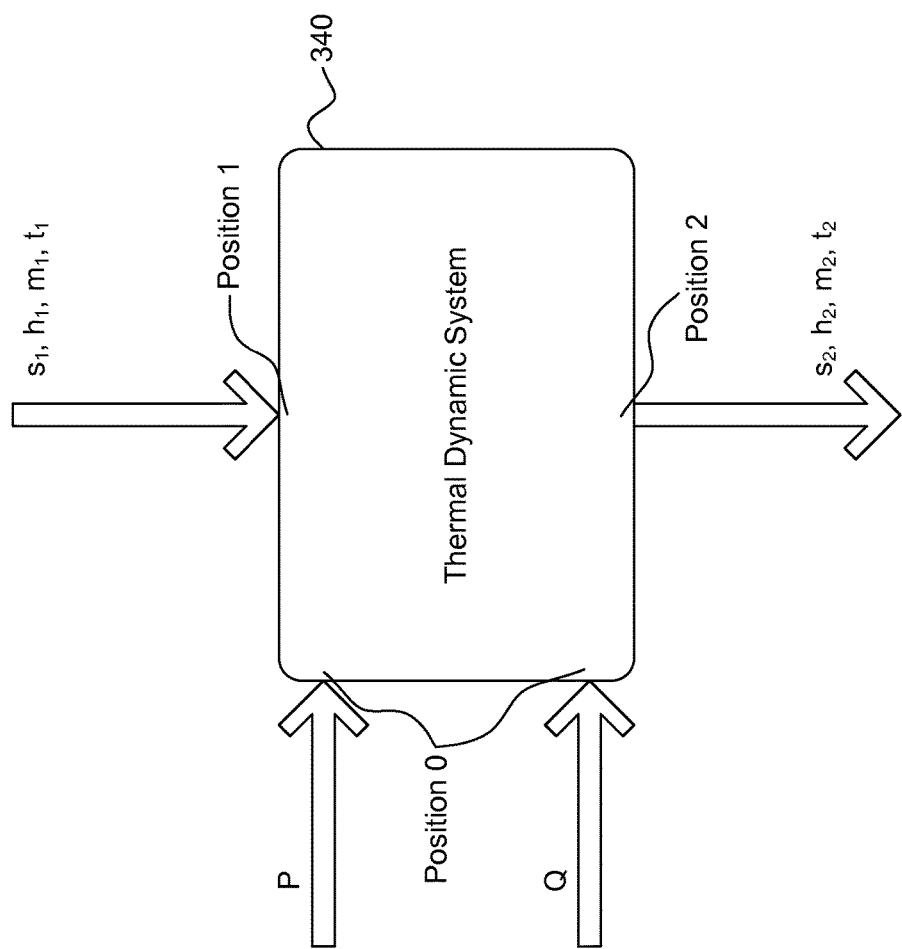
FIG. 2a illustrates a general representation of a thermal dynamic system with fixed boundaries in relation to the present invention.

FIG. 2a illustrates a general representation of a thermal dynamic system with fixed boundaries in relation to the present invention. Heat and mass flows are transported across the boundaries of a thermal dynamic system. The total entropy of the system is a state variable, hence its value must remain the same during steady states such as when a thermal distillation plant has reached a steady state operation condition, or after a complete thermal dynamic cycle, such as those that occur in an internal combustion engine Likewise, the total internal energy of the system is also a state variable.

The first law of thermal dynamics (energy conservation law) states that the time rate of change of the total internal energy of the system must equal the total heat input (the convention that a heat output is equivalent to a negative heat input) plus the sum of the enthalpy inputs whenever a mass flow is present, and the net power input. It reads, $$\frac{dU}{dt} = \sum_j \dot{Q}_j + \sum_k m_k \dot{h}_k + P \tag{1}$$

and the second law of thermal dynamics states that the time rate of change of the total system entropy is equal to the sum of the entropy input rate associated with each direct heat input plus the sum of the entropy flow associated with each mass flow, plus the sum of the internal irreversible entropy production rates. The irreversible entropy production rates must all be positive and could only vanish but never negative under idealized theoretical conditions. It reads, $$\frac{dS}{dt} = \sum_j \frac{\dot{Q}_j}{T_j} + \sum_k m_k \dot{s}_k + \sum_l \dot{S}_{irrevl} \tag{2}$$

where S and U are the total system entropy and total system internal energy, respectively, $m_k$ is the mass flow rate associated with the position (or port) k, P is the net power input (negative if output), c the specific enthalpy (per unit mass) associated with the position k, and $s_k$ the specific entropy associated with the mass flow at position k. $S_{irrevl}$ is the internal entropy production rate at some internal location l. The latter must be positive in accordance with the second law of thermal dynamics. For steady states, both $$\frac{dS}{dt} \text{ and } \frac{dU}{dt}$$

must vanish for reason already discussed.

By ways of an example, consider an idealized thermal distillation system 340 comprising an evaporation/condensation main block, a dirty water feed at position 1, an outlet for the distilled water and another one for the rejected brine at position 2. The distillate and brine are assumed to have the same thermal dynamic parameters for simplicity, although that can be easily generalized to having distinct outlets. The assumption is valid when the ejected brine and the distillate are closely coupled thermal dynamically, and the brine's TDS concentration is not significant enough to affect the specific entropy and enthalpy of the brine. The energy to drive the distillation is from a combination of direct heating and a mechanical work input at position 0 to simulate electrical resistive heater and the mechanical compression. Alternatively, the direct heating can also be replaced or supplemented by hot steam injection with very similar results, hence it won't be belabored here.

For steady state conditions, the energy conservation and the second law equations become;

$$Q + P = m_1(h_2 - h_1) \tag{3}$$

and $$m_1(s_2 - s_1) = \frac{Q}{T} + \sum_l \dot{S}_{irrevl} \equiv \frac{Q}{T} + \text{InternalEntropyproduction} \geq \frac{Q}{T} \tag{4}$$

where mass flow conservation is assumed (the mass flow from the feed water must balance the combined mass flows from the distillate and the brine outputs).

The internal entropy production in this case comes from heat conduction losses, resistances from fluid flows within the system, as well as energy losses from mechanical compression and other inefficiencies. Since entropy production is merely the energy change weighted by the inverse temperature, the thermal conduction loss for a heat flow Q between two temperatures $T_1$ and $T_2$ is simply $$Q\left(\frac{1}{T_2} - \frac{1}{T_1}\right) = Q\frac{T_1 - T_2}{T_1 T_2} > 0. \quad (5)$$

The inequality arises from the fact that Q must have the same sign as ($T_1$-$T_2$) since heat can only flow from higher temperature to lower temperature, which is the essence of the second law of thermal dynamics. Heat conduction can take place in the transverse direction to transfer the heat across the heat exchange walls, in the stream-wise direction, and also when the heat is leaked from the hot interior region to the cooler external environment. Fluid viscosity which tends to retard the movement of the fluid also contributes to the internal entropy production. The inherent inefficiencies of the mechanical compressor, motor, etc., also contribute to internal entropy generation. More generally, by going into the continuum limit, the internal entropy production rate can be expressed as a positive integral which satisfies the variational principle, meaning that the entropy production rate integral can be shown to be at its minimum for the solutions to the heat conduction equations and the viscous fluid dynamic equations. This would then permit the use of trial functions which approximated the true solutions of the internal system.

A variational method is widely used in physics, mathematics, computer sciences, etc., to provide approximate estimation of the real dynamics since the true solutions are difficult to obtain. Furthermore, since the magnitude of estimation errors can be predicted by the variational method, the trial functions usually provide excellent results. In the case of entropy production rate estimation, the trial function will always give a larger value, hence it would provide a more conservative estimate, which is desirable, since one can always be sure that the true results would be better than the estimates.

A performance comparison can now be made between mechanical compression (by setting Q=0) and direct heating (by setting P=0). Since the internal entropy production rate depends only on the irreversible processes which do not have any explicit dependencies on whether the distillation process is driven by direct heating or mechanical vapor compression, but instead, depends only on such parameters as thermal conductivities, wall thickness, geometry, fluid viscosity, etc., one can expect the entropy production to be broadly similar assuming the mechanical power input and the heat input are identical.

The case wherein the power input is in the form of direct heat input (for example, by using an electric heater) gives the energy conservation equation, $$Q = m_1 C_P (T_2 - T_1) \quad (6)$$

and the entropy equation, $$m_1 C_P \ln\left(\frac{T_2}{T_1}\right) = \quad (7)$$

$$m_1 C_P \ln\left(1 + \frac{Q}{m_1 C_P T_1}\right) = \frac{Q}{T} + InternalEntropyproduction.$$

For an efficient thermal distillation system, the term must be much smaller than 1 (noting that the temperatures are absolute temperatures), hence the logarithmic term can be approximated by keeping just the first term in the Taylor series expansion. Therefore, $$Q = \frac{T_1 T \cdot InternalEntropyproduction}{T - T_1}. \quad (8)$$

By contrast, for mechanical compression, the expression becomes, $$P = T_1 \cdot InternalEntropyproduction \quad (9)$$

which differs from the expression for direct heating by a heat pump like factor, or $$P = \left(1 - \frac{T_1}{T}\right)Q. \quad (10)$$

Since the heat pump factor $$\left(1 - \frac{T_1}{T}\right)$$

is much smaller than 1, especially when $T_1$ is close to T, the above relationship illustrates the thermal dynamic superiority of mechanical compression versus direct heating. It also shows the importance of reducing the internal entropy production rate. This explains why it is of uppermost importance to ensure that direct latent heat exchange can take place instead of the indirect latent heat to sensible heat transfer process in conjunction with sensible heat to latent heat transfer process. The latter requires very efficient heat transfer between the condensation chamber and the evaporation chamber. Clearly having a surface to volume ratio, which lowers the surface loading factor, can lower the temperature difference to effect a large reduction of the entropy generation rate. In the present invention, the surface to volume ratio can be generally 700 m$^{-1}$ or greater. The reason direct heating is less efficient than mechanical compression is because of the large entropy input in the form $$\frac{Q}{T}.$$

Lowering the surface loading factor minimizes the temperature difference (more accurately, LMTD, or logarithmic mean temperature difference) by maximizing the surface to volume ratio to be greater than 700 l/m.

The equations described above provide a way to estimate the input power (mechanical or heat) requirements from variational principle since the internal entropy production can be approximated by the trial function variational method.

Figure 2B:
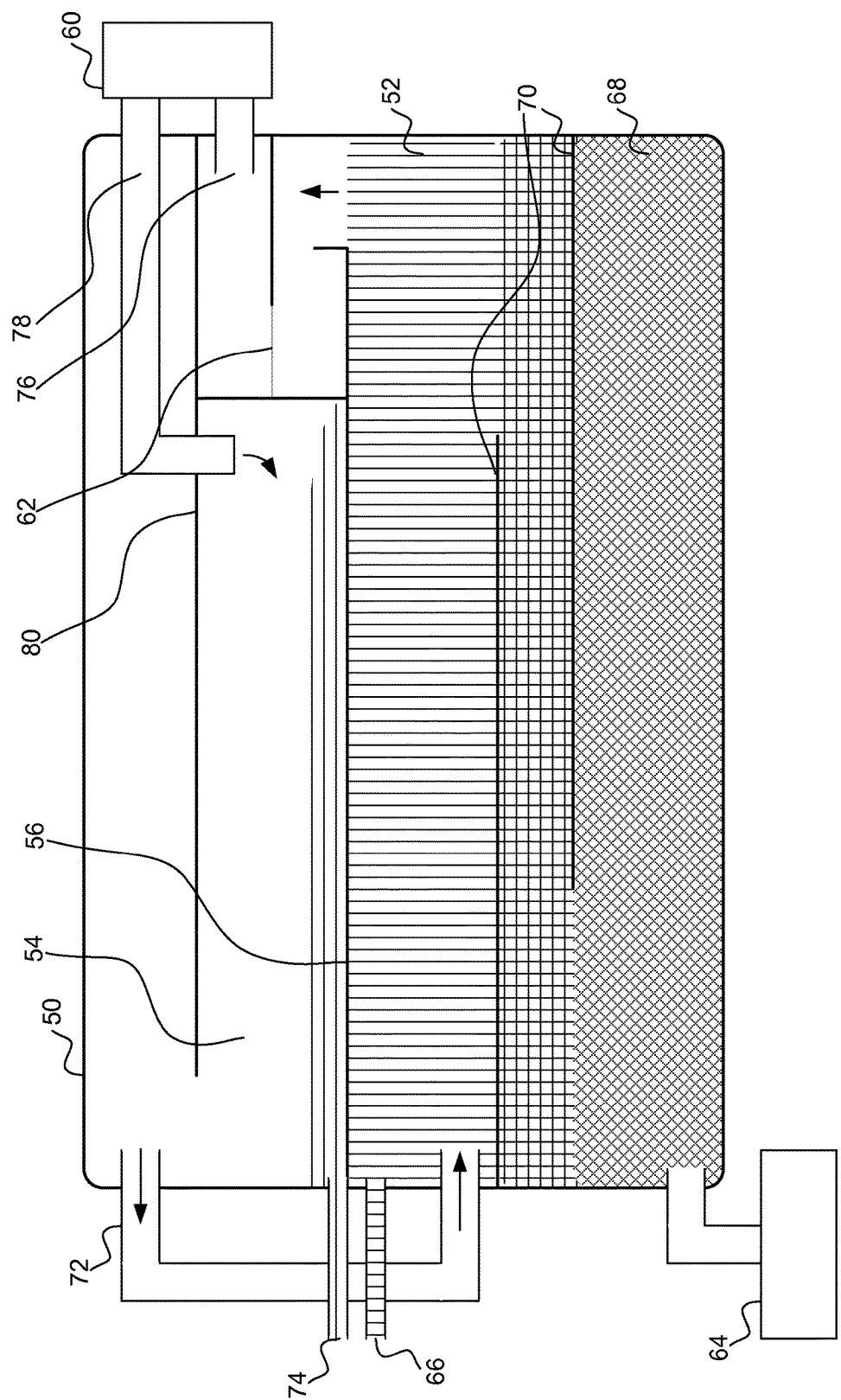
FIG. 2b illustrates a diagram of the present invention for water purification having a flooded evaporation chamber.

FIG. 2b illustrates a diagram of the present invention for water purification having a flooded evaporation chamber. A water purification apparatus of the present invention 50 comprises an evaporation chamber 52, a condensation chamber 54, a heat exchange wall 56 between the evaporation chamber 52 and the condensation chamber 54, a brine chamber 68, a compressor 60, a demister 62, and a brine pump 64. Typically, input water is pretreated to prevent clogging and fouling of the evaporation chambers due to settling of the sediment inherent in the input water stream as well as to reduce the scaling of the chamber walls. Pretreatments can include screening of the input water by using a screen filter or a sediment filter to remove larger debris or suspended particulates which may interfere with the main HDH processes. Finer dissolved or undissolved particulates as well as micro-organisms can also be pretreated by filtration through a flocculation mechanism, such as electroflocculation, biological processes such as slow sand filters or active carbon, or by pre-chlorination to prevent the growth of fouling pathogens on the plumbing and evaporation chambers. Calcium based dissolved solids should be treated with anti-scalants or coagulants to prevent scaling of the chamber walls and pipe-work. Pretreatment can occur during initial startups, during the resumption of the evaporation process after it has been momentarily halted, when the HDH process has become too unstable (e.g., caused by a rapid drop in the peak chamber temperatures for the controller to bring it back to the optimal state), or other situations.

The pretreated water can also be heated to a predefined temperature in order to supply a sufficient quantity of water vapor for the vapor compressor to work. Without the initial seed of water vapor present in the intake port of the compressor, the condensation would not take place with the consequent lack of latent heat transfer from the condensation chamber to the evaporation chamber and the feedback loop between the evaporation and condensation which is vital to the HDH process would not take place. The water can be preheated by using a solar water heater (not shown), powered by solar energy or other low quality heat sources. If further heating is necessary, then a secondary heater (also, not shown), e.g., an electric heater, using another power source can be utilized to further heat the input water to the predefined temperature. Also, the secondary heater can be used to bring the temperature to a higher level for periodic self-disinfection, e.g., when the operating temperature does not reach a safe zone for an extended period of time.

The pretreated input water 66 is inputted to the evaporation chamber 52, thereby flooding the evaporation chamber 52 such that the pretreated input water 66 is in contact with the heat exchange wall 56. Latent heat which is typically transferred from the condensation chamber 54 to the evaporation chamber 52 is efficiently transferred to the pretreated input water 66 in the evaporation chamber 52 since the pretreated input water 66 is entirely covering the heat exchange wall 56 on the evaporation chamber 52 side. Such submerged evaporation chambers together with hydrophobic condensation chambers with nominally horizontal (preferentially with a modest incline) heat exchange surfaces between the two promotes highly efficient dropwise condensation and percolating evaporation. In dropwise condensation, the condensate forms tiny beads on the heat exchange surface instead of a continuous film. These are the nucleation sites on which the droplets grow until they become too large to sustain themselves and the sudden rapid coalescence and sliding down of the oversize droplets continues to sweep and clear the surface to expose it directly to vapor molecules in the saturated gases.

The maximum drop radius before the sudden coalescence of neighboring droplets is called the departure radius. The departure radius for a metal surface is typically around 1-3 mm but it depends on various factors such as the surface temperature, surface and bulk thermal conductivity, vapor flow velocity, and the sliding mechanism. Typically sliding occurs when the coalesced drop size increases to a point when the force of gravity or other clearing mechanism becomes significantly larger than the surface tension force on the droplet. In dropwise condensation, there is no liquid film on the surface to resist latent heat transfer leading to achievable heat transfer coefficients of over ten times better than with filmwise condensation.

The sliding motion can be controlled by a combination of inclining the heat exchange surface from its approximate horizontal orientation by a suitable angle, and by adjusting the gas flow rate of the compressor as well as its compression ratio. Stronger sliding motion increases the mass flow rate of the condensate as well as reducing the departure radius which increases heat transfer. However, the increase in heat transfer coefficient typically is smaller than the increase in mass flow rate of the condensate which would necessitate an increase in the temperature difference between the evaporator and the condenser side of the heat exchange surface, which reduces efficiency. Hence the incline angle is another control parameter which can be utilized for the optimization of the system performances.

Dropwise condensation is only realized with hydrophobic surface materials in direct opposition to filmwise condensation. On the evaporation side a similar effect can be achieved with percolating, or sparging, evaporation. In percolating evaporation, the evaporation chambers are flooded with liquid which is permeated with percolating gas bubbles which are recirculated from the proximal end of the condensation chamber. Percolating evaporation, contrary to dropwise condensation, prefers hydrophilic surfaces wherein the gas bubbles resulting from the recirculation of the carrier gases from the condensation chambers and the growth of those bubbles from the continuous evaporation of the liquid into them leads to the formation of hanging bubbles right below the heat exchange surface. This beading of gas bubbles on the bottom of the heat exchange walls (the top of the evaporator surfaces) is a direct reversal of the dropwise condensation, and since such reversed beading requires very small contact angles; thus, the evaporator surface should be preferentially hydrophilic. Hanging bubbles create air bubbles so tiny that they rise in the water extremely slowly. This applies to air bubbles smaller than 0.1 mm, or so called herein micro-bubbles.

The enhanced latent heat transfer for the percolating evaporation process results from the growth and sudden collapse of the gas beads and subsequent upward sliding of the oversize air beads. Since there are no gas film between the evaporator surface and the liquid to resist the heat transfer, the heat transfer coefficients can be order of magnitude larger than the conventional evaporation chambers.

Although the contact angle of the heat exchange surfaces on the evaporator side is preferentially smaller than 90°, gas beads can still be formed as long as the contact angle is not close to 180°. Larger contact angles can increase the critical size of the air beads, which reduces heat transfer efficiency. Most of the hydrophobic polymers have contact angles no larger than 140°, hence enhanced latent heat transfer could still take place on such surfaces based on the percolation-evaporation principle.

Incondensable gases present in the HDH process can have a large and negative impact on the heat transfer across the heat exchange surface since they hinder the access of the vapor molecules to the heat exchange surface, forcing the vapor molecules to diffuse through them. However, it is known that the heat transfer is greatly enhanced in the turbulent regime in which the transversal gas movements permit the vapor molecules to be convected to the heat exchange surface on the condensation side. On the evaporation side, the turbulent liquid movements can likewise cause convective mixing of the liquid to overcome the poor thermal conductance of the liquid.

Although the Reynolds number for the onset of turbulent flow is around 2200, which is typically larger than the Reynolds number that can be achieved in a narrow channel flow, the flow is provoked into turbulence and micro bubble generation through micro-structured obstacles and by external agitations. The disclosed pulsational effect distillation (PED) of a compressor blade and the vortex forming nozzles employed to recirculate the uncondensed gases back into the flooded evaporation chambers both provide such effects. The turbulence and micro-structured obstacles and vortex forming nozzles can produce such micro-bubbles.

The turbulent motions of the fluids also confer additional benefits in their abilities to scrub the heat exchange surfaces as well as non-heat exchange walls. They also directly affect the onset of the sliding motion for dropwise condensation since they can accelerate the coalescence of the neighboring droplets and impart the coalesced droplets with oscillatory motions, causing them to be uprooted from their micro-scaled nucleation sites. This leads to smaller departure micro drop radius which improves heat exchange efficiency even further.

However, the presence of turbulent motions can increase the fluid drags which would increase the pumping pressure requirement of the compressor. Hence the tradeoff between increasing compressor power requirement and the improved heat exchange efficiency needs to be taking into consideration in the system design. Note that if the exterior walls are well-insulated, then almost all the turbulent motions would eventually be converted to heat, which would be utilized to increase the condensate production the same way direct injection of heat would do in any case, hence the overall energy efficiency would decrease only to the extent that the turbulence induced heat generation is less efficient than the mechanical energy used to drive the compressor. The relative inefficiencies of direct heat injection versus mechanical energy input will be detailed in a latter section.

The evaporation chamber 52 and the brine chamber 68 can also be connected such that the brine from the pretreated input water 66 is allowed to flow from the evaporation chamber 52 to the bottom of the brine chamber 68 via gravity driven sedimentation. Thus, the brine concentration at the evaporation chamber 52 is theoretically smaller than the brine concentration at the bottom of the brine chamber 68. As the brine chamber 68 gets more and more concentrated with brine, the osmotic pressure can increase the brine concentration in the evaporation chamber 52. Additional levels 70 of the brine chamber 68 can be used to increase the total path needed for the osmotic pressure to travel.

The brine pump 64 can pump the brine out of the brine chamber 68 to decrease the brine concentration, thereby alleviating any osmotic pressure. The brine pump 64 can be digitally controlled such that the brine concentration can determine the amount of pumping needed by the brine pump 64. The bring pump 64 can automatically set its rate of pumping based on the brine concentration. The pumped brine water can be further separated such that the concentrated brine and sedimentation is discarded, and the remainder of the pumped brine water can be recirculated to the evaporation chamber 52.

As gases are evaporated from the evaporation chamber 52, the gases are highly saturated with the pretreated input water. The highly saturated gases from the evaporation chamber 52 are guided through the demister 62 to an inlet 76 of the compressor 60. The compressor 60 compresses the highly saturated gases and outputs the supersaturated gases via an outlet 78 of the compressor 60 to the condensation chamber 54. The compressor 60 can be digitally controlled to adjust the flow rates of the gases at the inlet 76 and outlet 78 of the compressor 60 and the compression ratio for those gases as well. The disclosure further comprises a plurality of external micro-structured obstacles, external agitators and vortex forming nozzles configured to produce micro-bubbles for introduction into the evaporation chamber.

The purpose of the demister 62 is to permit the gas bubbles to be separated from the liquid in the evaporation chamber. Typically, the demister comprises a fine coated or uncoated metal screen with small enough mesh size to remove entrained liquid droplets in the form of mist in the evaporation chamber from getting into the compressor housing. Such entrained droplets are corrosive and harmful to the compressor and could also contain organic or inorganic contaminants which could cross contaminate the condensate on the condenser side. However, because the gas speed is typically three orders of magnitude higher than the speed of the liquid, the flow resistance exerts on the gases by the demister screen can lead to a non-negligible pressure drop. This reduces the efficiency of the compressor and requires more input power to compensate, resulting in a drastic reduction of the overall energy efficiency.

Due to the lower temperature and lower pressure operations, it is possible to replace the metal screen with a plastic demister. With the flexibility of plastic molding, the cross section of the wire mess could be reshaped into a longer and more streamlined shape. It is well known that an aerodynamically shaped cross section can be two to three order of magnitude lower in drag coefficient than a circular shaped cross section with the same frontal area. This would drastically reduce the pressure drop across the demister which helps to improve the overall energy efficiency. The energy lost to the frictional pressure drop across the demister screen is not lost. Instead, it can be converted into heat which adds to the heat energy input into the condensation chambers.

Since the preferred embodiment uses a flooded nearly horizontal evaporation chamber and is under the suction force of the compressor, the suction force may bring the brine liquid all the way to the entrance of the demister, hence a more effective separation of the gases and the brine liquid is needed. The preferred embodiment for the demister is to employ highly hydrophobic plastic materials such as Teflon for the demister mesh which can exert a negative capillary force against the brine liquid.

The supersaturated gases are inputted to the condensation chamber 54 to form condensed water (i.e., the product water or purified liquid) on the heat exchange wall 56. The heat exchange wall 56 is substantially aligned along a horizontal direction such that gravity is substantially perpendicular to the heat exchange wall 56 which is preferentially highly hydrophobic, thus causing the condensed water to form dropwise condensation on the heat exchange wall 56. Any remaining gases from the condensation chamber 54 can be recirculated to the evaporation chamber 52 via a path 72 to enhance evaporation and latent heat recovery performance through percolating evaporation. The condensation chamber 56 can have an outlet 74 to allow the condensed water, i.e., product water, to flow to a storage tank (not shown) or for other usage. The condensation chamber 54 can also comprise a ridge 80 for further condensation. The ridge 80 can be slightly tilted for dripping any condensed water onto the heat exchange wall 56. Supersaturated gases or air that remains can be recirculated to the evaporation chamber to enhance evaporation and latent heat recovery thru percolating evaporation thus generating a 2-phase flow on the evaporation side. On the condensation side, the flow is always 2-phased since it contains both the air/vapor and the condensate. The disclosure is therefore a 2-phase to 2-phase heat exchange.

Since the product water and the pretreated input water 66 are on either sides of the heat exchange wall 56, the latent heat transfer from the condensation chamber 56 to the evaporation chamber 52 is greatly increased, leading to greater overall efficiency for the water purification apparatus 50.

To further improve the heat exchange efficiency, the bulk thermal conductivity of the substrate of the heat exchange wall should be high, the exchange surface should be as large as possible, and the wall thickness should be as small as possible. The heat exchange wall 56 can be composed of a variety of heat conductive materials, e.g., polypropylene, anti-corrosive resistant metal alloys, polycarbonate, and/or other materials.

Although stainless steel, copper-nickel alloy, or titanium, all have orders of magnitude higher bulk thermal conductivity than plastic substrates such as polypropylene or polycarbonate, they have high wettability which are not conducive to dropwise condensation although they could be treated chemically or gold coated to improve surface energy. Plastic substrates such as polycarbonate and polypropylene are orders of magnitude cheaper in bulk and can be made thinner because of their superior corrosion resistances. And since HDH process operates at or near atmosphere pressure, the strength of the metallic substrates is not needed. Smaller thickness of the wall can partially compensate for the lower thermal conductance of the polymers.

In addition, the bulk conductivity of the polymeric substrates cab be enhanced with highly conductive fillers such as carbon black, carbon fibers or carbon nanotubes. Carbon additives such as carbon black can increase the bulk thermal conductivity by as much as a factor of 4. Nano-structured carbon substrates such as carbon fibers, and even more so, carbon nanotubes and graphene, which have thermal conductivity as high as pure silver, or in the case of carbon nanotube, as much as 20 times higher than silver and copper, the expected increase in bulk thermal conductivity could be an order of magnitude higher. Carbon fiber and carbon nanotube additives can also drastically increase the mechanical strength and stiffness of the polymer substrates, allowing even thinner wall construction.

Figure 3:
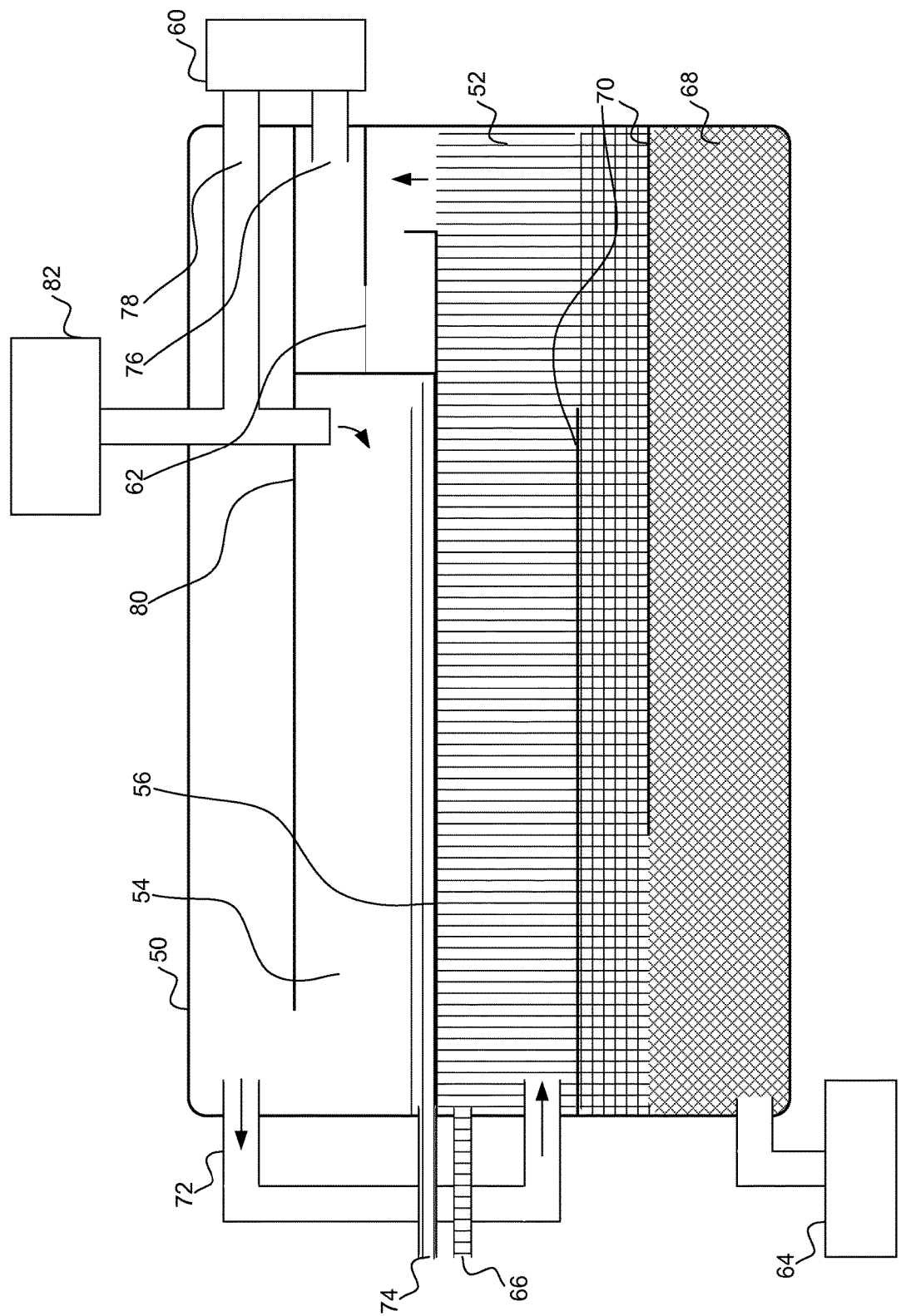
FIG. 3 illustrates a diagram of another embodiment of the present invention for water purification having an additional auxiliary steam generator.

FIG. 3 illustrates a diagram of another embodiment of the present invention for water purification having an additional auxiliary steam generator. The water purification apparatus of the present invention 50 can include an auxiliary steam generator 82 for a direct steam injection into the condensation chamber 54. At startup of the water purification apparatus 50, the auxiliary steam generator 82 can be initialized to promote the condensation and evaporation process. The auxiliary steam generator 82 can be powered by mechanical energy, solar energy, thermal energy, electrical energy, or other means for generating power. By using mechanical, solar, and/or thermal, the water purification apparatus can be very ecofriendly and leverage the surrounding natural resources.

Figure 4:
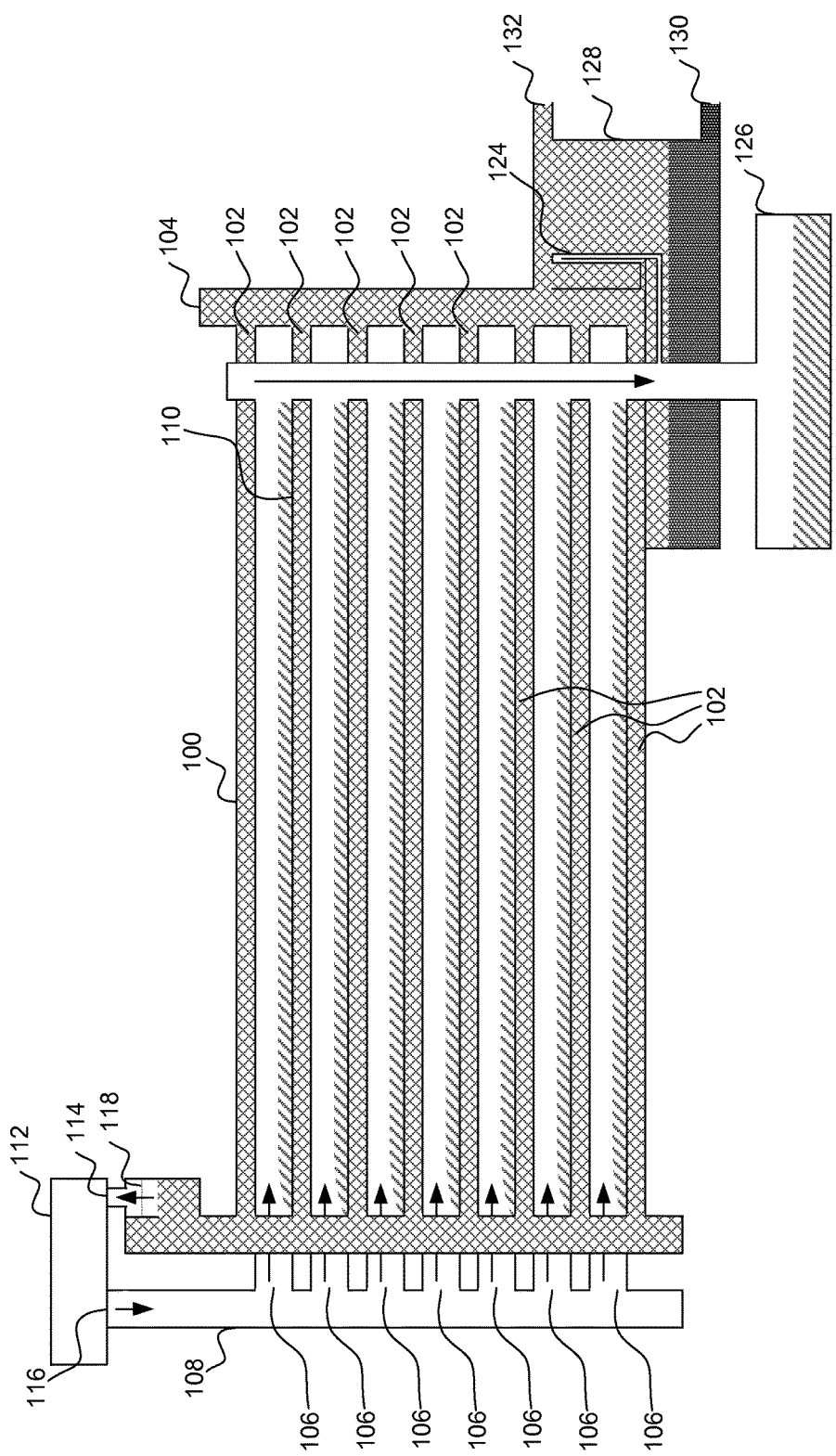
FIG. 4 illustrates a diagram of the present invention for water purification having multiple channels for the evaporation chamber and condensation chamber.

FIG. 4 illustrates a diagram of the present invention for water purification having multiple channels for the evaporation chamber and condensation chamber. A water purification of the present invention 100 can be adapted by having multiple channels 102 of an evaporation chamber 104 interlaced with multiple channels 106 of a condensation chamber 108. The channels 102 of the evaporation chamber 104 and the channels 106 of the condensation chamber 108 are interlaced such that any one channel of the evaporation chamber 104 is between any two channels of the condensation chamber 108, and likewise any one channel of the condensation chamber 108 is between any two channels of the evaporation chamber 104, except for the outer most channels. Furthermore, there is a heat exchange wall between the interfaces of each channel of the evaporation chamber 104 and each channel of the condensation chamber 108, e.g., heat exchange wall 110. The channels 102 of the evaporation chamber 104 and the channels 106 of the condensation chamber 108 can be substantially aligned along a horizontal direction such that the condensed water will tend to pool onto the heat exchange walls due to gravity. The perforated panel array as well as the tube array with spacers are all designed to guide and restrict the movements of various fluids including inputted water, distillate, air, vapor and brine in such a way to minimize the LMTD (logarithmic mean temperature differences) between fluids which are exchanging latent heat and the unavoidable transfer to sensible heat which is kept at a minimum since the latent heat must first be converted to sensible heat in order to reach the inter facial boundary for evaporation to take place.

The channels 102 of the evaporation chamber 104 are connected together at their ends. Likewise, the channels 106 of the condensation chamber 108 are connected together at their ends. A compressor 112 of the water purification apparatus 100 can have an inlet 114 from the evaporation chamber 104 to receive the saturated gases and an outlet 116 to the condensation chamber 108 to output the supersaturated gases to the condensation chamber 108. A demister 118 can be connected between to the evaporation chamber 104 and the compressor 112 to demist the saturated gases. In addition, an air filtration device (not shown), e.g., an elector static precipitator or other electric filtering system, can be used to further filter the saturated gases for unwanted particles. The water purification apparatus 100 can recirculate gases from the condensation chamber 108 to the evaporation chamber 104 via a P-trap 124, or by another method or apparatus. The product water from the condensation chamber 108 is guided to the product water storage 126. The product water descends from the channels 106 of the condensation chamber 108 due to gravity, or using another method, to the product water storage 126. The gases also descend from the channels 106 of the condensation chamber 108 to the P-trap 124, which is further connected to the evaporation chamber 104. Since pressure is greater in the condensation chamber 108 than the evaporation chamber 104, the gases from the condensation chamber 108 will flow through the p-trap 124 and exit into the evaporation chamber 104. Due to this higher pressure, the input water in the evaporation chamber 104 will not backflow through the p-trap 124 to the condensation chamber 108. A micro bubble generation nozzle (not shown) or other bubble generation mechanism can also be positioned at the end of the P-trap 124 to generate micro bubbles as the gases are guided into the evaporation chamber 104. In other words, a micro bubble generator or other micro bubble generation mechanism can also be positioned at the end of the P-trap to generate micro bubbles as the gases are guided into the evaporation chamber.

A brine chamber 128 can provide the input water to the evaporation chamber 104. The brine chamber 128 can have multiple levels (not shown) to increase the path taken for the osmotic pressure. Also, there can be a brine outlet 130 from the brine chamber 128 to pump the highly concentrated brine from the bottom of the brine chamber 128. The brine chamber 128 can also have an inlet 132 for inputting the input water into the brine chamber 128 and to flood the evaporation chamber 104 with the input water.

In order to increase the amount of product water, a water purification apparatus of the present invention can have a condensation chamber comprising multiple panels, where each panel has multiple channels. The panels can be interconnected at its ends and are spaced a predefined distance away from each other. The panels are further disposed in a cavity in which the cavity is filled with the input water to serve as the evaporation chamber. Thus, the input water is flooded around the panels, and the barrier of the panels serve as heat exchange walls between the condensed water within the channels of the panels and the input water at the exterior of the panels. Further description of this arrangement is provided in the subsequent descriptions.

Figure 5:
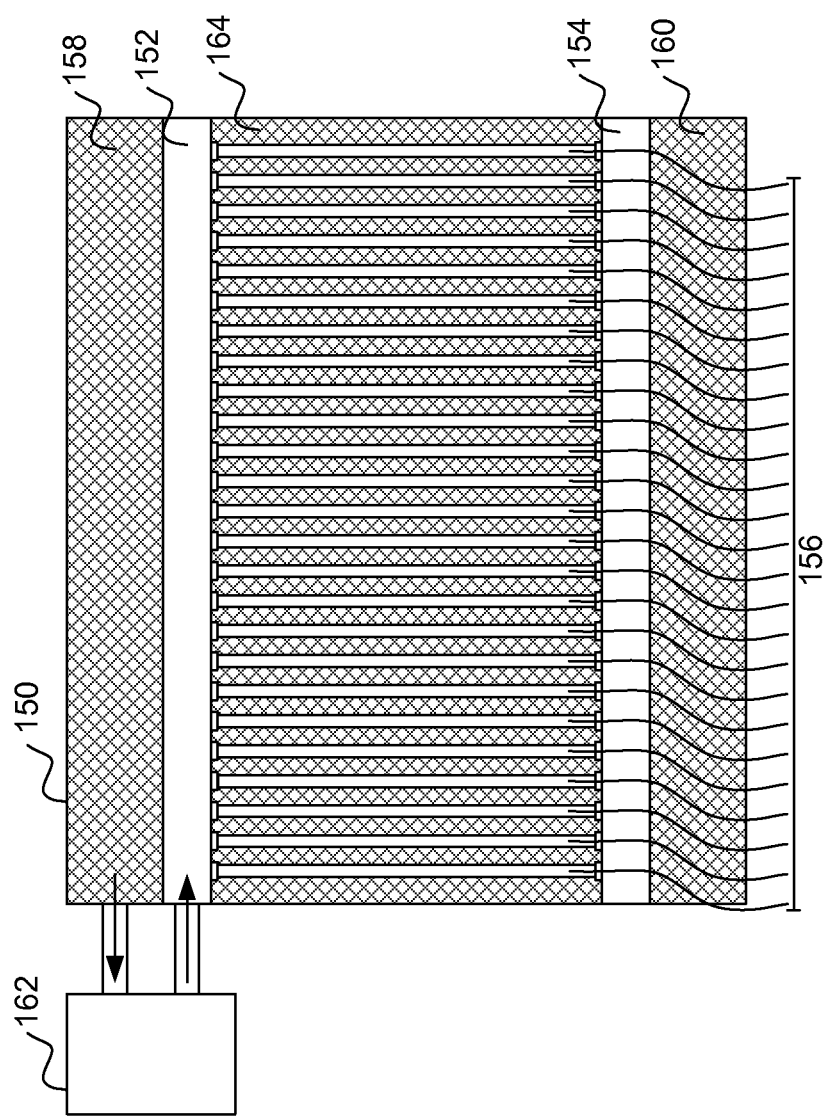
FIG. 5 illustrates a diagram of a water purification apparatus of the present invention having multiple panels for the evaporation chamber and condensation chamber.

For instance, FIG. 5 illustrates a diagram of a water purification apparatus of the present invention having multiple panels for the condensation chamber. A water purification apparatus 150 can have a form factor in a rectangular shape, wherein a proximal manifold 152 is located on an upper side of the water purification apparatus 150 and a distal manifold 154 is located on a lower side of the water purification apparatus 150. Furthermore, panels 156 of the condensation chamber can be rectangular and mounted vertically, horizontally, or at other angles in the water purification apparatus 150. Each of the panels 156 can have multiple channels (not shown). Also, the panels 156 of the condensation chamber can also be rectangular in shape to match the overall form factor of the water purification apparatus 150. An evaporation chamber of the water purification apparatus 150 can comprise of areas exterior to the panels 156, but within the water purification apparatus 150 (e.g., area 164), an upper section 158, and a lower section 160. These areas, the upper section 158 and the lower section 160 are connected such that the input water and any gases within the input water can freely flow between these three sections of the water purification apparatus 150.

The channels of the panels 156 are sealed from the evaporation chamber to prevent any leakage of input water from the evaporation chamber into the channels of the panels 156. However, dry air from the channels of the panels 156 are recirculated into the evaporation chamber via the distal manifold 154. A compressor 162 can receive the highly saturated gases from the evaporation chamber at the upper section 158 and output super saturated gases to the proximal manifold 152 which connects to the channels of the panels 156. Thus, the super saturated gases are guided from the top of the channels of the panels 156 to the bottom of the channels of the panels 156. The condensed water in the channels of the panels 156 are pooled in the distal manifold 154, and further guided to a product water storage (not shown) or for usage.

It is understood that the above described form factor for the water purification apparatus 150 is only one of many form factors that can be used for implementation of the present invention. It is apparent that a person having ordinary skill in the art can use the present invention to implement a variety of other form factors. Therefore, these other form factors of the present invention are also encompassed by the present invention.

Figure 6:
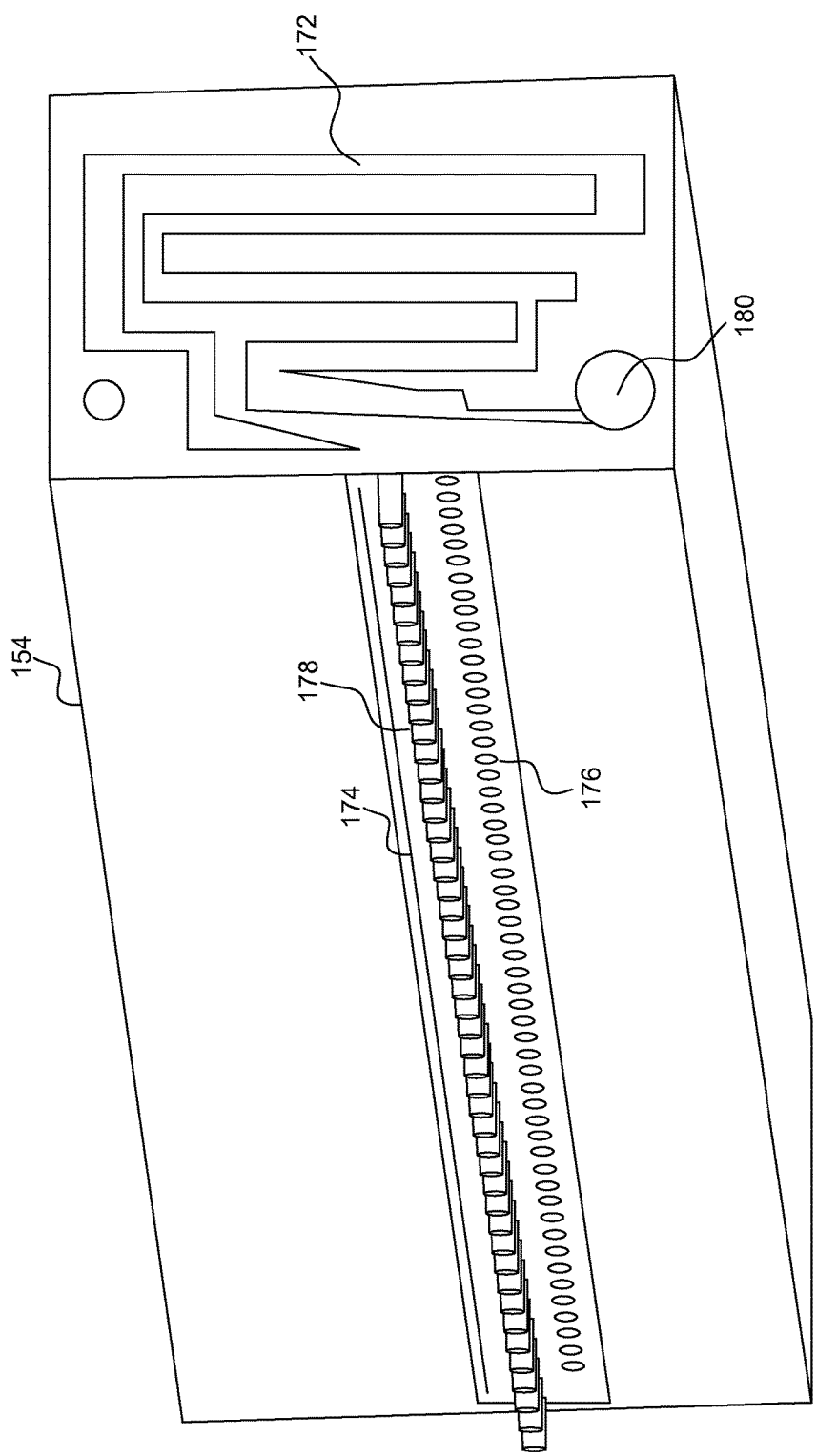
FIG. 6 illustrates a diagram of a distal manifold of the water purification apparatus of the present invention.

FIG. 6 illustrates a diagram of a distal manifold of the water purification apparatus of the present invention. The distal manifold 154 comprises a p-trap 172, a slit 174, drain holes 176, mounting pegs 178, and a product water guide 180. The p-trap 172 recirculates the gases from the panels 156 of the condensation chamber to the evaporation chamber via the slit 174. The slit can have a bubble generation apparatus (not shown) for promoting the generation of bubbles into the evaporation chamber. The drain holes 176 connect the panels 156 to the product water guide 180 to allow the product water, condensed in the panels 156, to be collected and then guided to the product water storage via the product water guide 180. The mounting pegs 178 allow for the panels 156 to be mounted and secured within the water purification apparatus.

Figure 7:
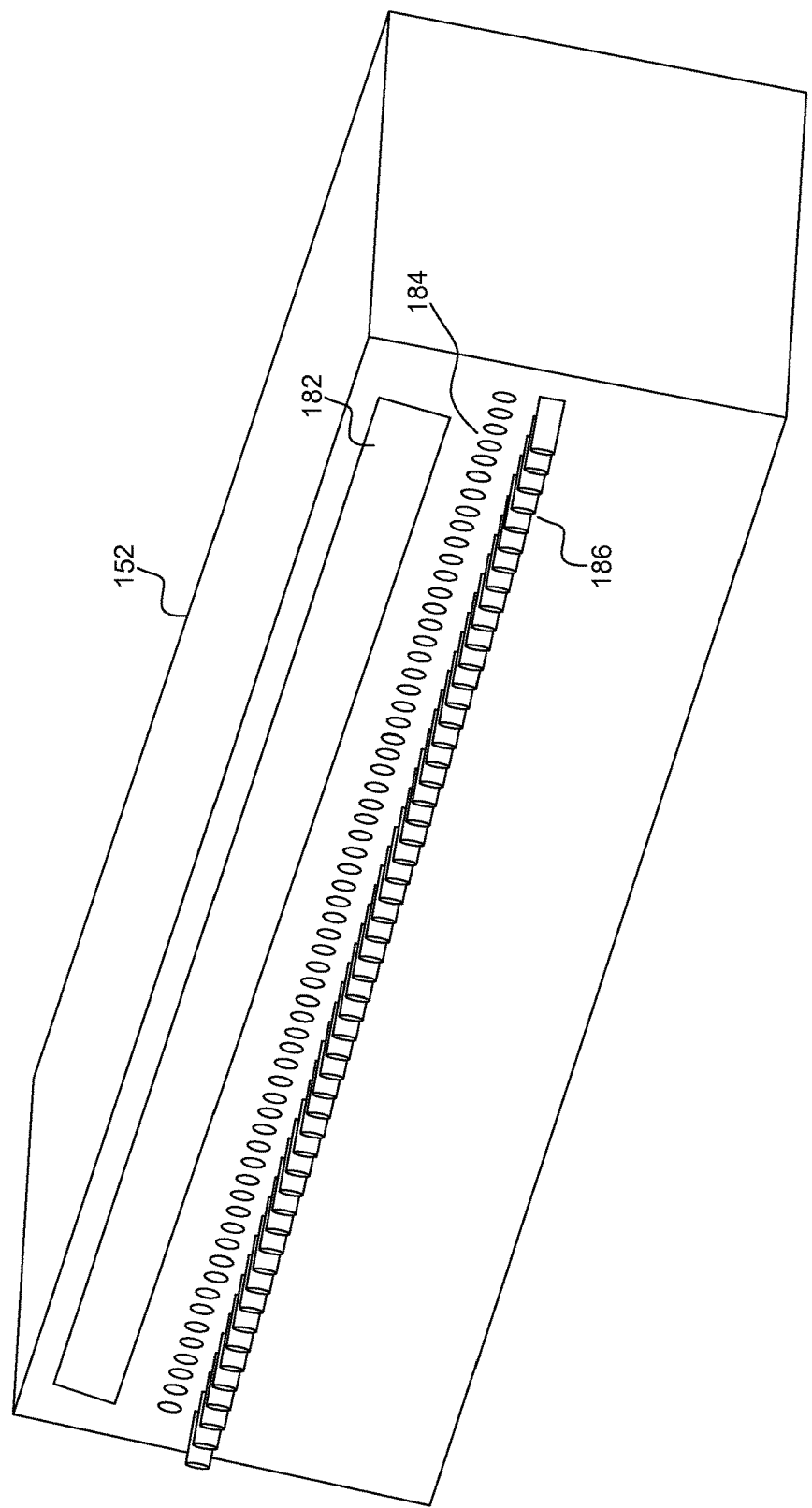
FIG. 7 illustrates a diagram of a proximal manifold of the water purification apparatus of the present invention.
Figure 8:
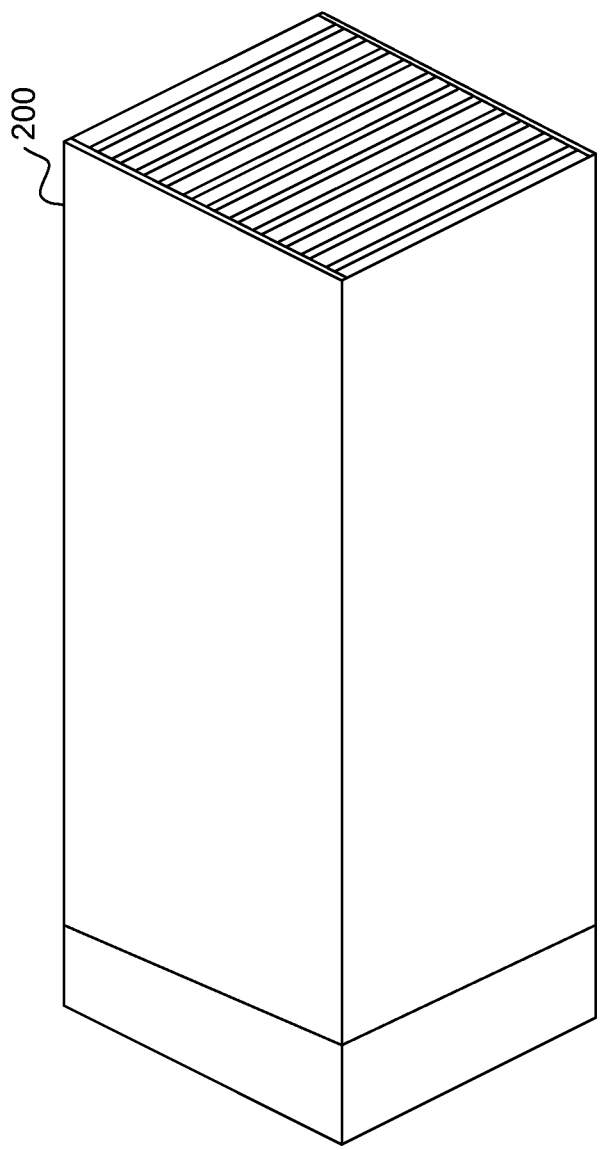
FIG. 8 illustrates a perspective view of a water purification apparatus of the present invention.

FIG. 7 illustrates a diagram of a proximal manifold of the water purification apparatus of the present invention. The proximal manifold 152 of the present invention comprises an evaporator inlet 182, saturated gas outlets 184, and mounting pegs 186. The evaporator inlet 182 collects the highly saturated gases from the evaporation chamber, and then guides those gases to an inlet of the compressor of the water purification apparatus of the present invention. The compressor compresses those highly saturated gases and outputs the super saturated gases to the panels 156 via the saturated gas outlets 184. The mounting pegs 186 are used to mount and secure the panels 150. FIG. 8 illustrates a perspective view of a water purification apparatus of the present invention. As stated above, a water purification apparatus 200 can have a rectangular form factor. A perspective view of the water purification apparatus illustrates such form factor.

Figure 9:
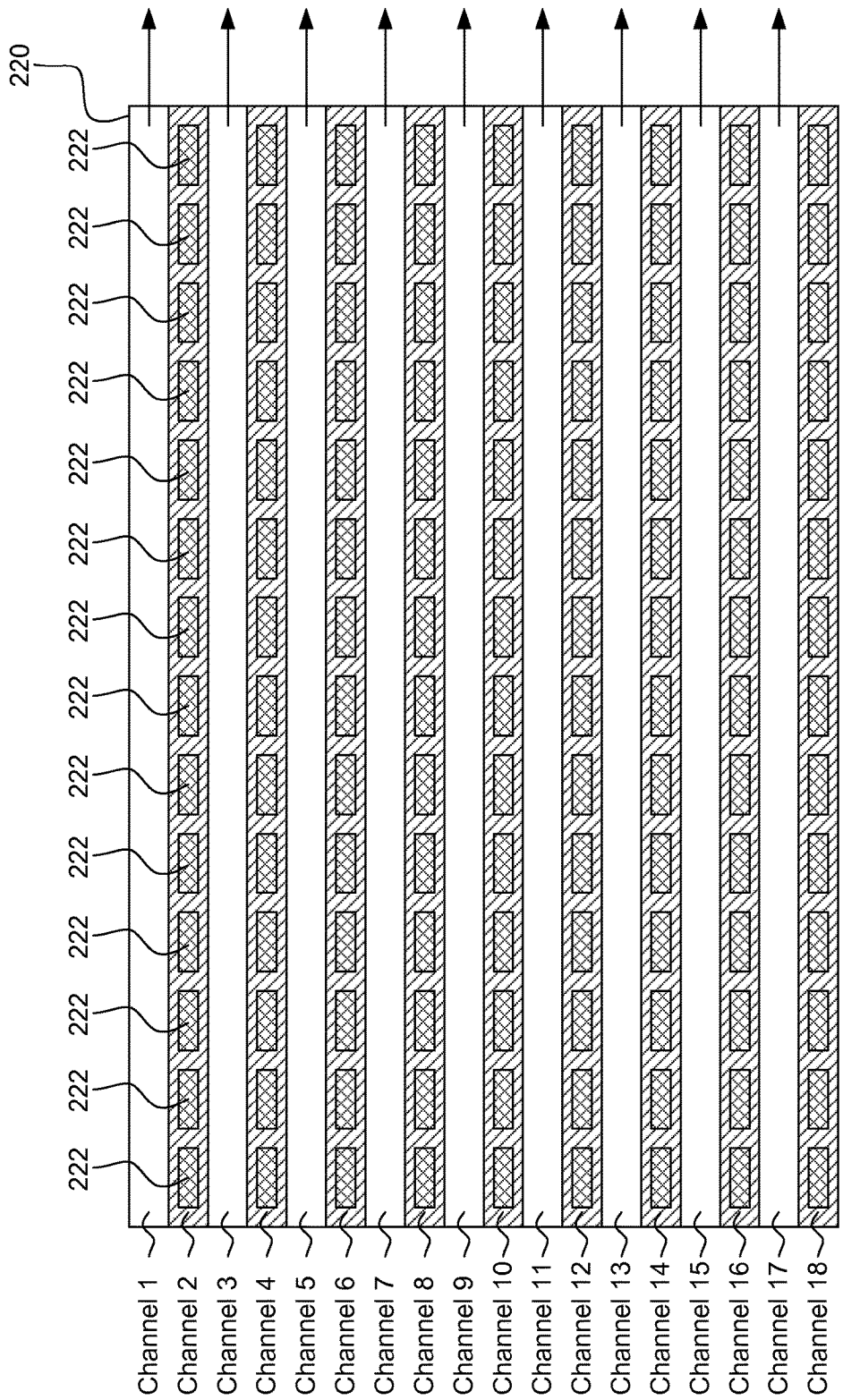
FIG. 9 illustrates a top view of a panel of a condensation chamber of the present invention having several perforations through the even numbered channels of the panel.

FIG. 9 illustrates a top view of a single panel of the present invention having several perforations through the even numbered channels of the panel. Each panel can have a plurality of channels, e.g., channels 1-18. The channels can have one or more cross sectional shapes, including rectangular, elliptical, or other shapes. In this example, the channels are rectangular in shape, such that a top view of the channels is rectangular. Channels 1, 3, 5, 7, 9, 11, 13, 15, and 17 are substantially impermeable to exterior liquids and/or gases, while channels 2, 4, 6, 8, 10, 12, 14, 16, and 18 have perforations that link the interior of those channels to exterior liquids and/or gases present at the exterior of the panel. Thus, the perforated channels 2, 4, 6, 8, 10, 12, 14, 16, and 18 are flooded with liquids and/or gases present at the exterior of the panel. The ends of perforated channels 2, 4, 6, 8, 10, 12, 14, 16, and 18 are sealed to prevent any outside liquids and/or gases from entering into the condensation chamber and any of the non-perforated channels. In essence, the non-perforated channels serve as the condensation chamber and the perforated channels augment the evaporation chamber.

Typically, the channels of the panel are substantially impermeable from gases and/or liquids leaking into the channels from the exterior of the panel. However, to improve thermodynamic processes, every other channel along the panel can have perforations that are cut into the channel that allow the perforated channel to be flooded with any exterior liquids and/or gases that surround the panel. For instance, if liquid surrounds the panel, the liquid can surround the non-perforated channels from all sides since the adjacent channels of the panel are perforated.

The non-perforated channels have highly saturated gases that flow from one side of the non-perforated channels to the other side of the non-perforated channels, as detailed above. The exterior of the panel is in contact with the liquid in the evaporation chamber. Thus, the walls of panel that form the non-perforated channels act as heat exchange walls between the condensation chamber and the evaporation chamber. Gases that are recirculated into the evaporation chamber can also travel through the flooded area, thereby colliding and stumbling through the network of perforations and panels. Since the paths of the gases are increased, the recirculated gases can be further saturated before being collected by an inlet of the compressor of the water purification.

Figure 10:
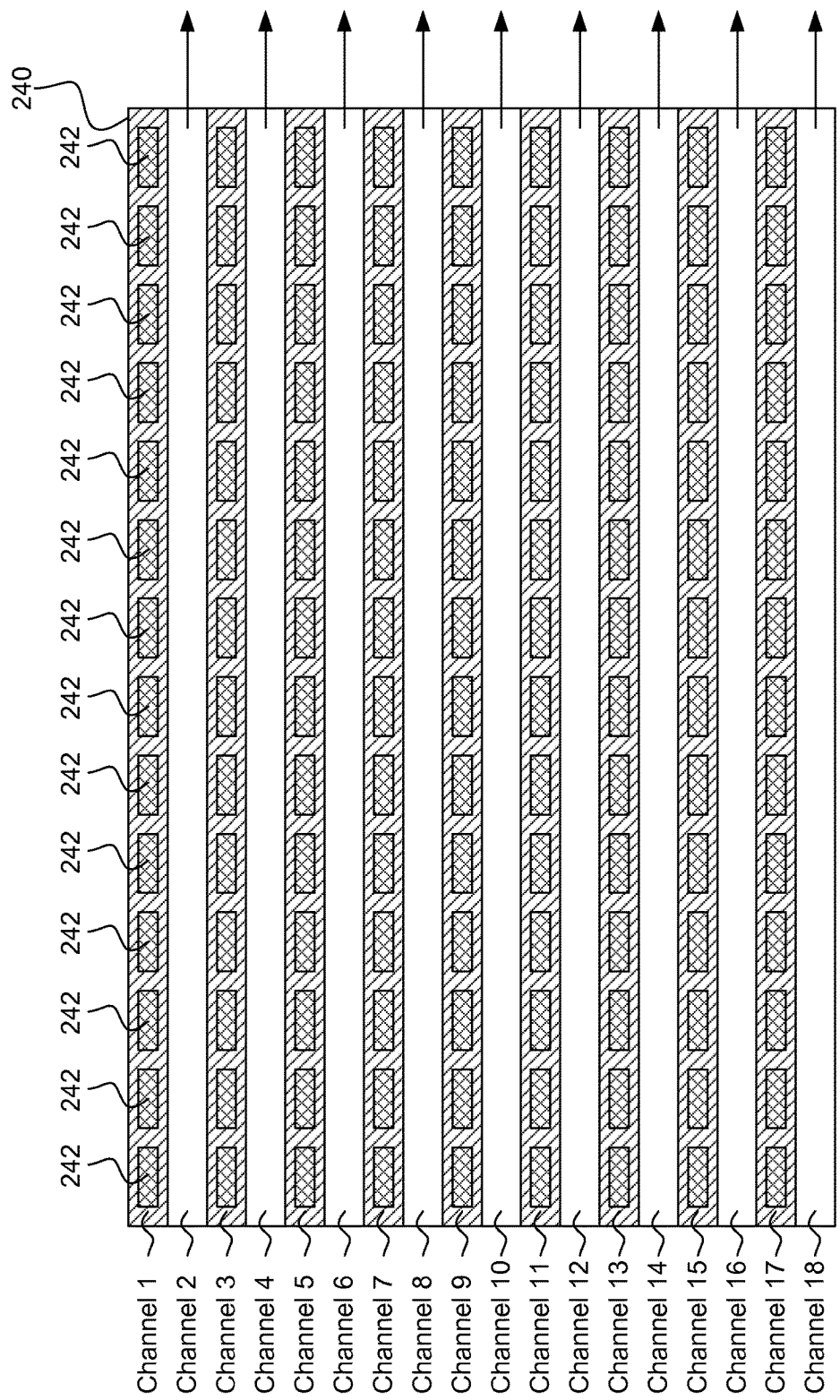
FIG. 10 illustrates a top view of a panel of a condensation chamber of the present invention having several perforations through the odd numbered channels of the panel.

FIG. 10 illustrates a top view of another panel of the present invention having several perforations through the odd numbered channels of the panel. Channels 1, 3, 5, 7, 9, 11, 13, 15, and 17 have perforations. The perforations allow for those perforated channels 1, 3, 5, 7, 9, 11, 13, 15, and 17 to be flooded with liquid and/or gases present at the exterior of the panel. Channels 2, 4, 6, 8, 10, 12, 14, 16, and 18 are sealed from the exterior of the panel to prevent leakage from the exterior of the panel into the non-perforated channels 2, 4, 6, 8, 10, 12, 14, 16, and 18. The ends of channels 1, 3, 5, 7, 9, 11, 13, 15, and 17 are sealed to prevent any outside liquid and/or gases from entering the condensation chamber and any of the non-perforated channels of the panel.

The condensation chamber can have an array of panels (as illustrated in FIG. 5), where each panel has multiple channels. As previously discussed, certain channels of each panel can have perforations, e.g., at every other channel along the panel, such that any liquid and/or gases exterior to the panel is substantially prevented from leaking into the non-perforated channels. The perforated channels from one panel and an adjacent panel can be offset such that there are no direct perpendicular lines that can cross through one perforated channel of a first panel to another perforated channel of a second adjacent panel. The purpose is to increase the path that any gases may take from one end of the evaporation chamber to the other end of the evaporation chamber by having to cross through the perforated channels of the condensation chamber.

Therefore, several panels can be arranged in an array to form parts of the condensation chamber, where a first panel has perforated channels on the even numbered channels of that panel, a second panel has perforated channels on the odd numbered channels of that panel, a third panel has perforated channels on the even numbered channels of that panel, and so on and so forth, such that the perforations are offset from the any two adjacent panels to increase the path any gases may need to take from one side of the evaporation chamber to the other side of the evaporation chamber.

The perforations can also be of varying lengths. Furthermore, the perforations of a first panel may be also offset from the perforations of a third panel to further increase the length that any recirculated gases must travel through the input water in the evaporation chamber.

Figure 11:
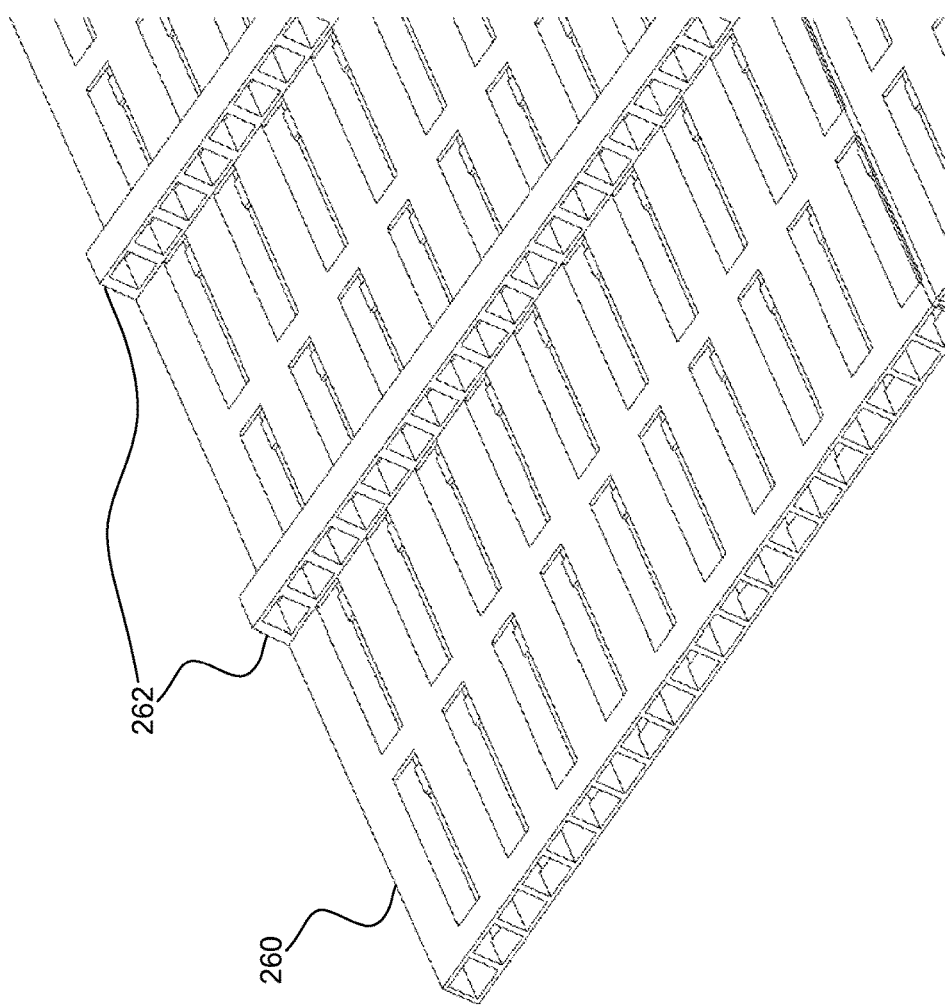
FIG. 11 illustrates a zoomed-in perspective view of a panel of a condensation chamber of the present invention having several perforations through some of the channels and a spacer.

FIG. 11 illustrates a zoomed-in perspective view of a panel of the present invention having several perforations through some of the channels and spacers. A panel 260 of the present invention can comprise of channels that are perforated at every other channel and have a spacer 262 to separate any two adjacent panels from each other.

Figure 12:
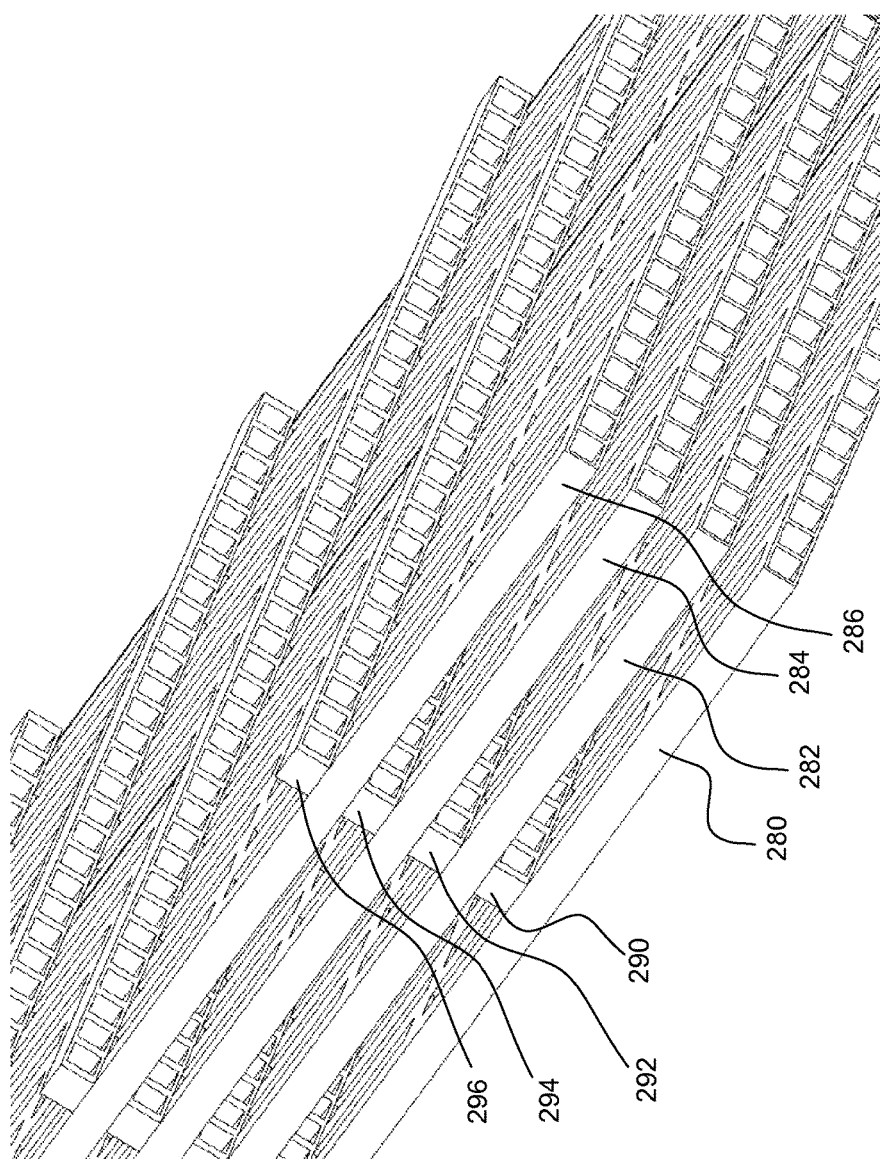
FIG. 12 illustrates a zoomed-in perspective view of several panels of a condensation chamber of the present invention.

FIG. 12 illustrates a zoomed-in perspective view of several panels of the present invention. Several panels 280-286 are disposed adjacent to each other to form a portion of the condensation chamber. Each of the panels 280-286 has perforated channels. Furthermore, spacers 290-296 are disposed between the panels 280-286 for structural integrity.

Figure 13:
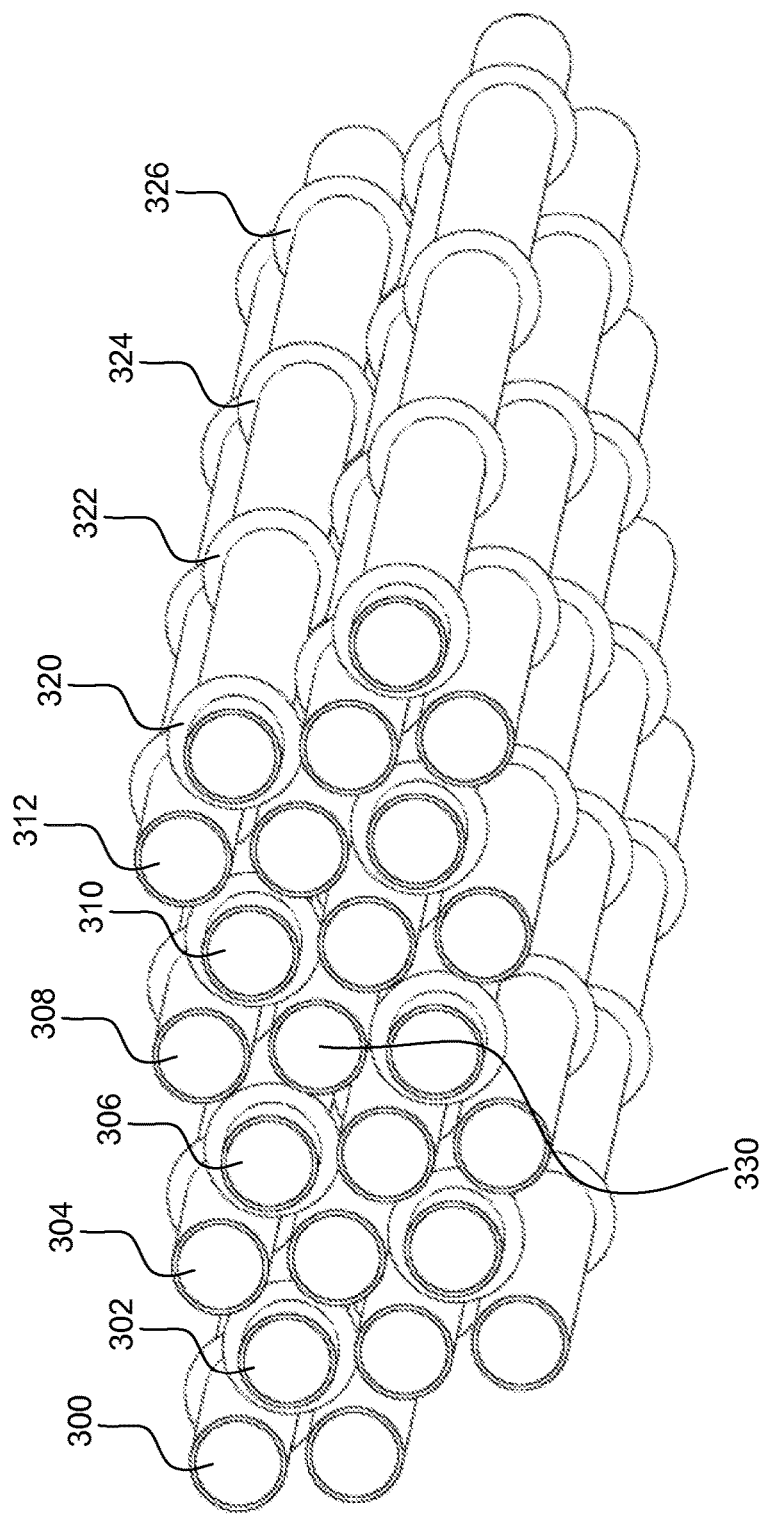
FIG. 13 illustrates a grouping of tubes to form a condensation chamber of the present invention.

FIG. 13 illustrates a grouping of tubes to form a condensation chamber of the present invention. In an embodiment of the present invention, a plurality of tubes, e.g., tubes 300-312, can be grouped together to form channels of a condensation chamber of the present invention. The walls of the tubes can serve as the heat exchange walls between the condensing liquid-saturated gases within the tubes and the input liquid of the evaporation chamber that is exterior to the tubes. Spacers, e.g., spacers 320-326, can be positioned around a tube such that there is a gap between any two adjacent tubes when the adjacent tubes are grouped together. When the tubes are submerged within the evaporation chamber, gases and the input water in the evaporation chamber flood the exterior of the tubes, i.e., the space in between any two adjacent tubes, and hence surround each of the tubes.

Preferably, the volume of the input liquid in the evaporation chamber is equal to the inner volume of the tubes of the condensation chamber. Due to the dense packing of the tubes within the evaporation chamber, the total surface area of the heat exchange walls of the tubes are greatly increased. For instance, a group of tubes that are grouped together within a volume of one foot by one foot by two feet can have a total surface area for the heat exchange walls of around 700 sq. feet or more. Thus, generally speaking, the packing density of the present invention can rival some reverse osmosis filtration systems.

The tubes can be grouped together in a variety of configurations to maximize the total surface area of the heat exchange walls and/or to maximize other considerations for the evaporation chamber and the condensation chamber. For instance, preferably, the tubes are packed in a hexagonal pattern, where the radial center for each of the tubes is equidistant from the radial centers of adjacent tubes. For tubes within the boundary of the tube grouping, i.e., an inner tube), the inner tube will have six adjacent tubes. For example, a tube 330 is an interior tube and has six adjacent tubes surrounding the tube 330.

Since the tubes are submerged within the evaporation chamber, the ends of the tubes are sealed so that the input liquid from the evaporation chamber does not leak into the tubes of the condensation chamber. Multiple methods for sealing the ends of the tubes from the evaporation chamber can be implemented. For instance, a gasket assembly can be used at the ends of the tubes to seal the inside of the tubes from the evaporation chamber. The gasket assembly can route saturated gases into the interior of the tubes while providing a tight seal to prevent the input liquid in the evaporation chamber from leaking into the tubes. The gasket assembly will become more apparent in the following descriptions.

Figure 14:
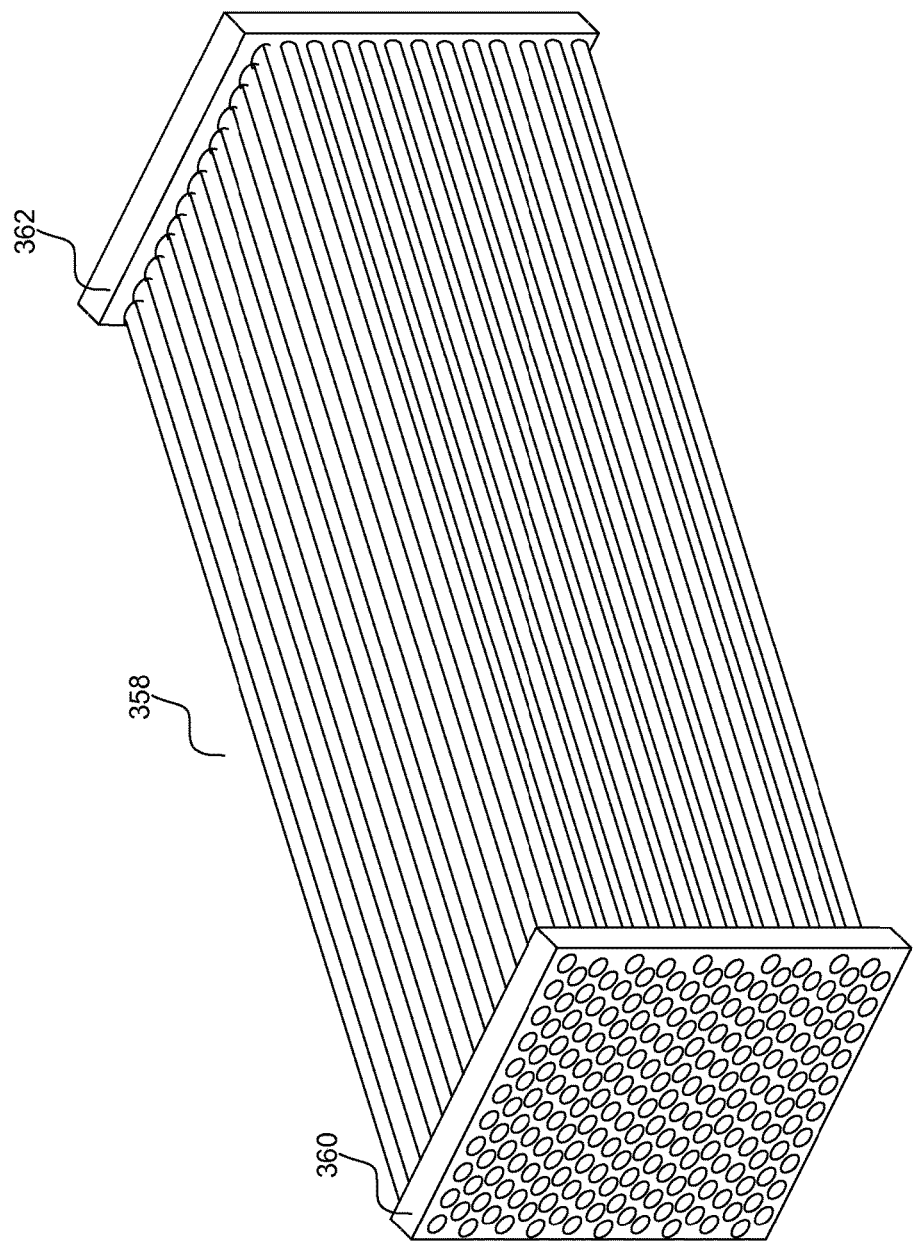
FIG. 14 illustrates a rectangular tube cartridge for the condensation chamber of the present invention.

FIG. 14 illustrates a rectangular tube cartridge for the condensation chamber of the present invention. In various embodiments of the present invention, the tubes of a condensation chamber of the present can be grouped together in a rectangular tube cartridge 358. The ends of the tubes of the rectangular tube cartridge 358 are sealed by an end cap 360 and 362. End caps 360 and 362 of the rectangular tube cartridge 358 can be inserted into companion assemblies (not shown) of a water purification apparatus of the present invention to form a gasket assembly. Once the end caps 360 and 362 are fitted to the companion assembly, the exterior of the tubes and the interior of the tubes are sealed from each other. Hence, input liquid within the evaporation chamber that is exterior to the tubes cannot leak into the interior of the tubes. Also, the rectangular tube cartridge 358 and the gasket assembly are detachable from a respective water purification apparatus should the need arise, e.g. if the tubes need to be cleaned or replaced. Additionally, the tube cartridge can also be shaped in a variety of shapes, e.g., an elliptical shape, a circular shape, a trapezoidal shape, etc., to fit into a water purification apparatus of the present invention.

Figure 15:
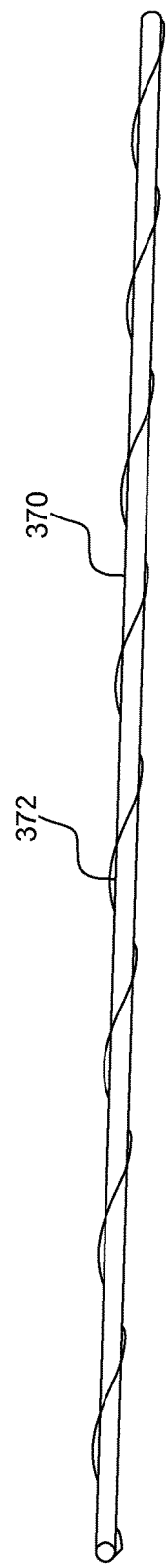
FIG. 15 illustrates a tube of the condensation chamber of the present invention having a spacer.

FIG. 15 illustrates a tube of the condensation chamber of the present invention having a spacer. The tubes of the condensation chamber of the present invention can have spacers around the exterior of the tubes. The spacers serve to physically separate any two adjacent tubes from each other when the tubes are grouped together. Also, the spacers serve to capture gas bubbles within the evaporation chamber that travel near the tubes. Once captured, the gas bubbles are driven along the spacer, thereby slowing down the gas bubbles from reaching an end of the evaporation chamber.

A spacer of a tube can have one or more fins that extend from one end of the tube to the other end of the tube. For instance, a tube 370 can have a spacer 372. The spacer 372 is a single fin that extends around the exterior of the tube 370 from one end to the other end in a spiral. The spacer 370 can also have a lip or edge at the end of the fin to capture gas bubbles traveling near the tube 370.

In alternative embodiments, the spacer of the tube 370 can have multiple fins (not shown) that extend around the exterior of the tube 370 in a spiral. Furthermore, instead of fins, the spacer of the tube 370 can be rings that protrude from the tube 370 at various locations along the length of the tube 370 (e.g., as illustrated in FIG. 13).

Figure 16A:
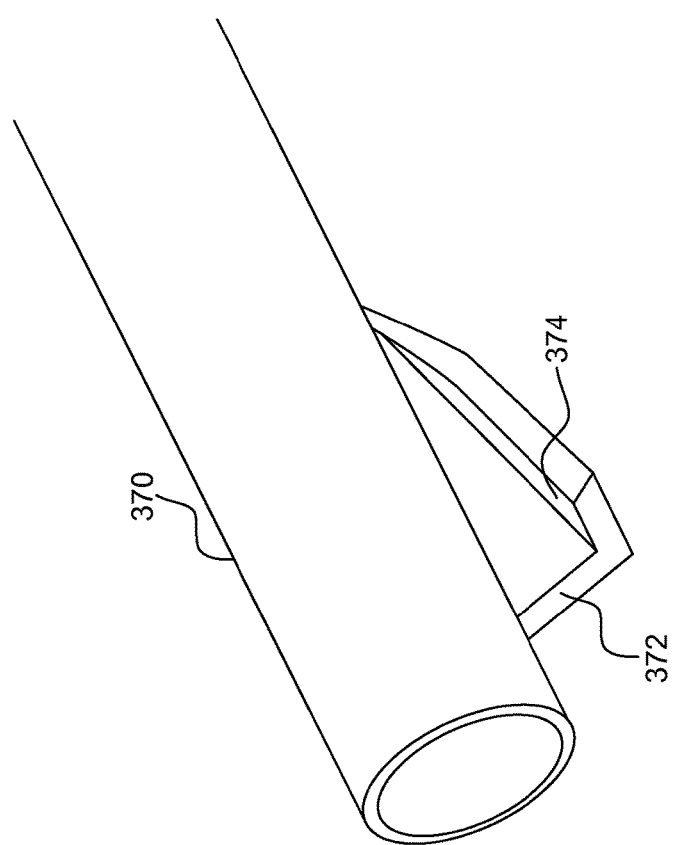
FIG. 16a illustrates a zoomed-in view for an end of a tube of the condensation chamber of the present invention.

FIG. 16a illustrates a zoomed-in view for an end of a tube of the condensation chamber of the present invention. The spacer 372 of the tube 370 can have an edge 374 on the distal side from the tube 370 to capture gas bubbles. The edge 374 can be set at varying degrees relative to the rest of the spacer 372. The edge 374 can also extend with the spacer 372 along the length of the tube 370. Additionally, the edge 374 can be tapered at certain locations along the tube 370 to allow for the trapped gas bubbles to escape the spacer 372.

Figure 16C:
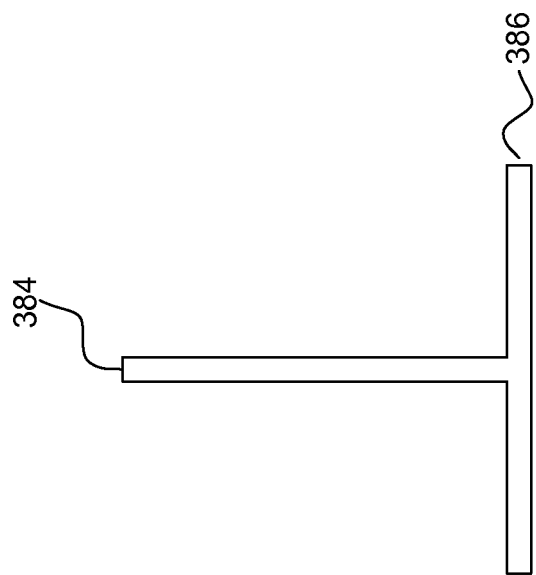
FIGS. 16b-16c illustrate various cross sectional shapes for a spacer of a tube of the present invention.
Figure 16B:
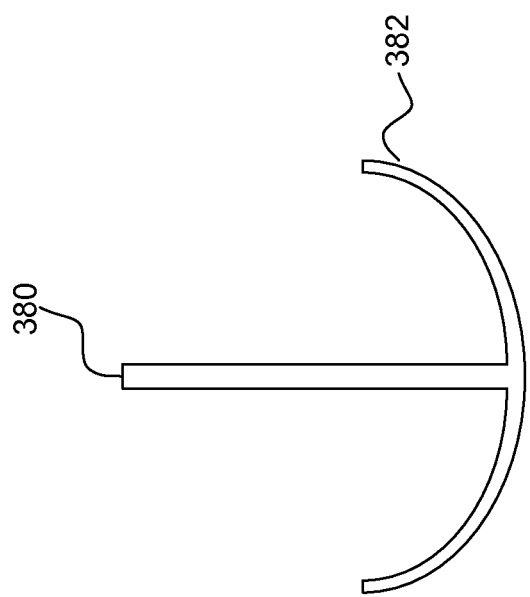

FIGS. 16b-16c illustrate various cross sectional shapes for a spacer of a tube of the present invention. The edge of a spacer of the present invention can have varying shapes. For instance, a spacer 380 can have a curved edge 382 that extends to both sides (or either side) of the spacer 380. Also, the spacer 384 can have a flat edge 386 that extends to both sides (or either side) of the spacer 384. Based on the present disclosure, it is apparent to a person having ordinary skill in the art that other edge shapes can also be used in conjunction with the present invention. Therefore, it is understood that the present invention also teaches those various edge shapes as well.

Figure 17:
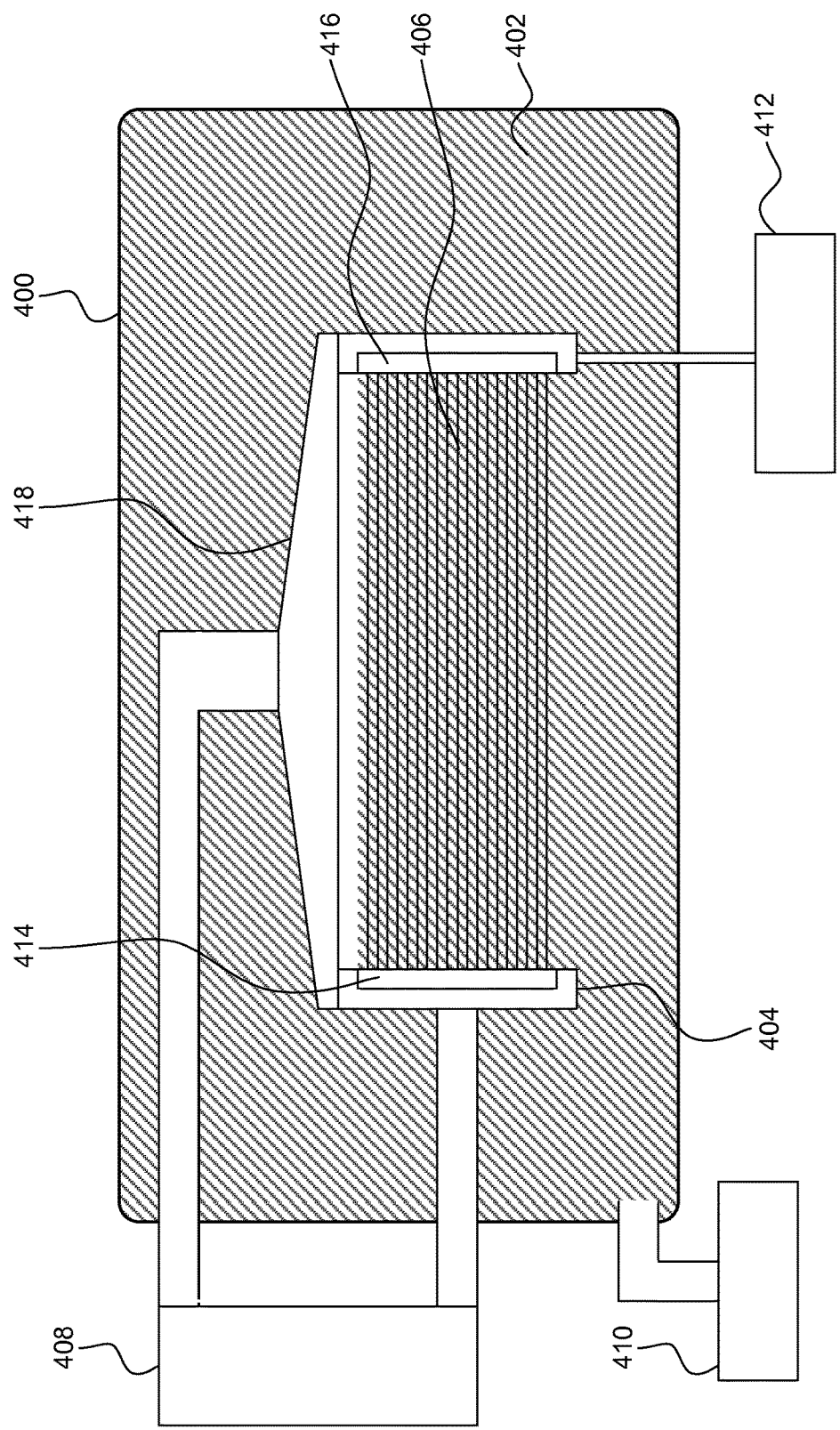
FIG. 17 illustrates a diagram of another embodiment of the present invention for water purification having a rectangular tube cartridge.

FIG. 17 illustrates a diagram of another embodiment of the present invention for water purification having a rectangular tube cartridge. A water purification apparatus of the present invention 400 comprises, an evaporation chamber 402, a condensation chamber 404 having a rectangular tube cartridge 406, a compressor 408, a brine pump 410 and a product water reservoir 412. The evaporation chamber 402 is flooded with input liquid such that the rectangular tube cartridge 406 is submerged within the input liquid. The rectangular tube cartridge 406 has a first endcap 414 and a second endcap 416. The endcaps 414 and 416 are fitted into a gasket assembly of the water purification apparatus 400 to form a seal to prevent the input liquid from leaking into the interior of the tubes of the rectangular tube cartridge 406.

A hood 418 routes the saturated gases from the evaporation chamber 402 to the compressor 408. The compressor 408 can then pressurize the saturated gases and output supersaturated gases to the tubes of the rectangular rube cartridge 406. The supersaturated gases travel through the endcap 414 to the other side of the tubes, i.e., to the side having the end cap 416. The compressor 408 can be located within the thermal boundaries of the water purification apparatus 400 to transfer its mechanical energy to the water purification apparatus 400. For instance, the compressor 408 can be submerged into the evaporation chamber 402 (not shown) such that the mechanical energy from the compressor 408 is transferred to heat the input water. In addition, the vibrations of the compressor 408 also aid in vibrating the water purification apparatus 400 to unlodge various brine and other impurities from the spacers and tubes of the condensation chamber 404.

As the supersaturated gases condense within the tubes, the product water can be drained into the product water reservoir 412. The tubes of the condensation chamber 404 can be slightly tilted at an angle such that gravity can pull the product water into the product water reservoir 412 below. The dry air from the tubes can be routed to the bottom of the evaporation chamber 402 or the bottom of the condensation chamber 404. When the brine concentration reaches a predefined level, the brine pump 410 can be activated to start pumping the brine from the bottom of the evaporation chamber 402.

It is apparent to a person having ordinary skill in the art that other features disclosed in the present invention can be used in conjunction with the water purification apparatus 400. Therefore, it is understood that those feature can also be applied to this embodiment of the present invention.

Figure 18:
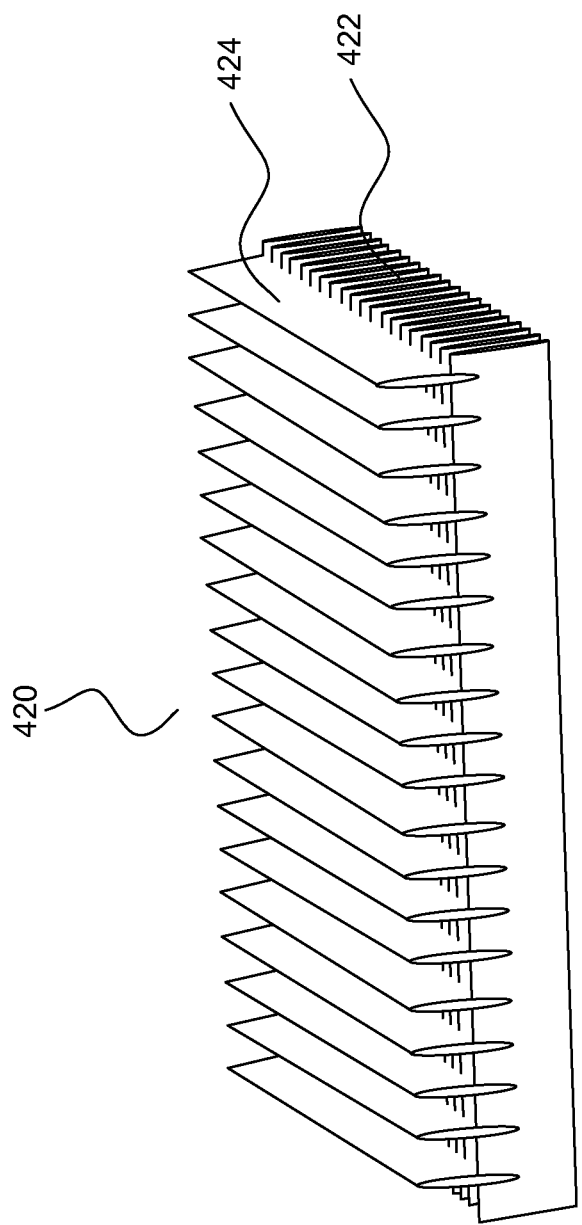
FIG. 18 illustrates a perspective view of a demister of the present invention.

FIG. 18 illustrates a perspective view of a demister of the present invention. A demister 420 of the present invention can have two layers 422-424 of aerodynamic fins coupled onto each other, e.g., stacked onto each other, glued together, molded together, or using other manufacturing techniques to form the two layers. The first layer 422 can comprise of a plurality of aerodynamic fins made of hydrophobic material to prevent liquid from wetting the surface of the fins. The fins of the first layer 422 can be substantially aligned in parallel. The second layer 424 can comprise a plurality of aerodynamic finds made of hydrophilic material to promote wetting at the surface of these fins. The fins of the second layer 424 can also be substantially aligned in parallel. The fins of the first layer 422 and the fins of the second layer 424 can be positioned substantially perpendicular to each other. Other layers of fins can be added as necessary or designed.

As gasses and liquid boils from the evaporation chamber, the emitted liquid will tend to come in contact with the first layer 422, but since the first layer is hydrophobic the liquid will break apart into smaller beads. If the smaller beads continue upward, the second layer 424 which is hydrophilic will promote wetting of those beads on the second layer 424, rather than allowing the beads to escape onward, e.g., to the compressor. Once the beads of the input water gather on the second layer 424, gravity will work to pull the beads of input water back into the evaporation chamber.

Figure 19:
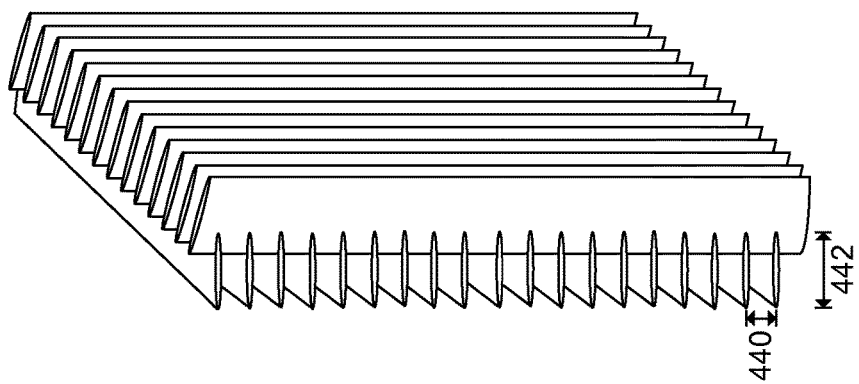
FIG. 19 illustrates an additional perspective view of a demister of the present invention.

FIG. 19 illustrates an additional perspective view of a demister of the present invention. Preferably, a separation distance between the centers of any two adjacent fins of a layer can be a fifth of the width of each of the fins. For instance, the separation 440, between the centers of two adjacent fins of the same layer is ⅕ the length of the width 442 of the fins of that layer. Other distancing arrangements are apparent to a person having ordinary skill in the art based upon the present disclosure.

Figure 20:
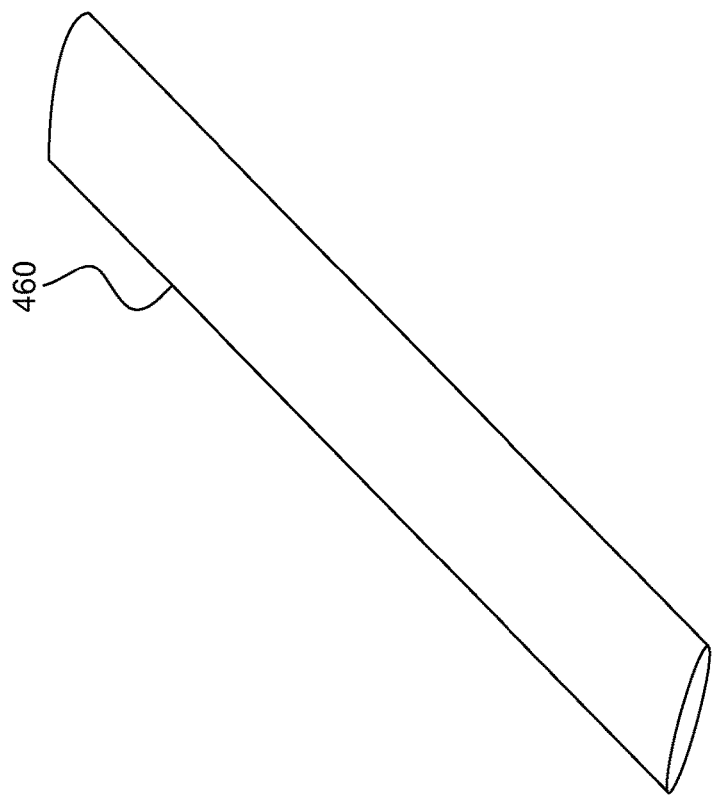
FIG. 20 illustrates an aerodynamic fin of a demister of the present invention.

FIG. 20 illustrates an aerodynamic fin of a demister of the present invention. An aerodynamic fin 460 of a demister can have an aerodynamic design to allow for gasses to pass through the fin.

As apparent from the above disclosure, the present invention aims to present simple, modular, and affordable water purification methods, apparatuses, and systems that are able to be adapted to local conditions, using less power and even possibly naturally available energy sources, like solar and wind power. The present invention can be self-monitoring and is field maintainable with minimal training and does not need the use of consumables for maintaining optimum system performance.

The present invention can also utilize sensors located inside the water purification apparatus to monitor the temperature and moisture at the various stages to optimize efficiency and product water output. For instance, airflow in the condensation chamber can be controlled to maintain the correct differential to encourage maximum condensation.

A control system of the water purification apparatus can continuously monitor the water purification apparatus, e.g., for controlling input water pre-heating, energy management (including solar and wind power generation), controlling the temperature at various stages to maintain safe temperatures to prevent mold formation, provide a graphical user interface via a handheld device—wired/wireless and be able to log all system operations, self-maintenance: monitor the quality of the input, drain, and product water several times per unit of time, detect when the efficiency of the system is going down—possibly caused by scaling and thereby initiating a self-flush/cleaning cycle, and monitoring the system temperature on a continuing basis to ensure that the system operates in a safe temperature zone and does not become a breeding ground for dangerous bacteria/mold—by controlling the electric heater to self-sanitize the system periodically. Additionally, the control system can monitor the TDS level.

Perhaps even more importantly, the control system can be employed to optimize the operation for maximum energy efficiency through the principle of minimum entropy production. In HDH devices, entropy productions are predominantly the results of heat transfer through a temperature difference between the source and sink. Although the entropy production processes are internal to the system, its magnitude can be estimated by monitoring the heat input and output rate as well as the temperature and mass flow rate of each external port in real time. Once the total entropy production rates are obtained, a MIMO (multiple-input/multiple-output) adaptive control algorithm can be employed to keep the entropy production near the minimum level by using the entropy production as the objective function for the control optimization since the operation state which is most energy efficient is also the one with least entropy production and vice versa. Alternatively, the objective could be chosen to be the unit energy cost rather than entropy productions to take into account the varying costs of different energy resources. Thus it would be possible to employ a mixture of mechanical compression and direct heating through the auxiliary steam generation to achieve the lowest total energy cost.

The primary energy input for the Pulse Effect Distillation (PED) process is mechanical gas compression. Although such a heat exchange maintains a temperature gradient which is an intrinsic characteristic of a counter-flow heat exchanger, the specific PED distillation process mimics an ideal thermodynamically reversible process and indeed approaches that ideal limit when cross-wall and flow-oriented thermal resistances are zero and infinity, respectively.

As such, the energy efficiency of PED based water purification process depends entirely on how close the PED process can imitate the ideal thermodynamic reversible process, which in turn depends on the minimization of the specific rate of increase in the entropy flows between the input fluid (source water) and the output fluids (product water and brine). The sources of such entropy rate increases are primarily the direct heat input which introduces entropy inflow. Note that mechanical energy input introduces no increase in entropy inflow and internal entropy production rates. Internal entropy production mainly comes from cross wall and parallel thermal transfers as well as from viscous and turbulent resistance to fluid flows for both water and gases (air and water vapor).

For inadequately insulated PED enclosures, the inevitable heat dissipation to the external environment also introduces additional entropy production with attendant loss of energy efficiency. The disclosed direct latent heat exchange or 2-phase to 2-phase heat exchange, counter-flow heat exchange design is fully reversible for all intents and purposes. A) Both sides of the common wall contain a 2-phase flow and the surface to volume ratio is large, at least 600 m-1 using atmospheric pressure and evaporation-condensation. The direct latent heat exchange is of uppermost importance to ensure a direct heat exchange.

Supersaturated gases are formed from the mechanical vapor compression process. Pure water vapor in industrial distillation/desalination plants does not become supersaturated since there is no air involved as these are mostly vacuum distillation processes. Saturated vapor means the vapor that is contained in air has reached saturation pressure. Supersaturation means after compression, the vapor within air becomes greater than the saturation pressure. This is characteristic of a meta-stable state since super saturated vapor condenses as soon as the latent heat contained within it can be released by heat exchange to the evaporation side.

The perforated panel array as well as the tube array with spacers are all designed to guide and restrict the movements of various fluids including inputted water, distillate, air, vapor and brine in such a way to minimize the LMTD (logarithmic mean temperature differences) between fluids which are exchanging latent heat and the unavoidable transfer to sensible heat which is kept at a minimum since the latent heat must first be converted to sensible heat in order to reach the inter facial boundary for evaporation to take place.

The resulting temperature drop along the heat conducting path reduces the temperature at which the evaporation takes place. With micro-bubbles close to the heat exchange walls, the heat conducting path is either nonexistent or is extremely small, so the effect of temperature drop is minimized or avoided. The LMTD minimization is accomplished by aligning the input flow of dirty water and air micro-bubbles preferably along the channel for panel arrays or along a direction of a hexagonal tube array so the flow is in the direction of increasing temperature from second end to the first end. The cooler input water is released into the second end and the vapor generated via evaporation, together with air itself, exit the first end to enter the compressor inlet where the temperature reaches its highest point. The compressed and supersaturated air exits the compressor and enters the second end of the condensation channels via tubes with a slight increase in temperature due to compression, and the supersaturated vapor (air or water that is supersaturated) travels down the condensation channels and proceeds to condense along the channel walls.

The supersaturation state of the air/vapor is maintained since the gas mixture experiences a steady decrease in temperature once the vapor condenses and becomes merely saturated by traveling downward toward the second end. The colder wall temperature again brings it back to the supersaturated state, much like how rain shower is generated by the collision of the warm front and the cold front. Therefore, the evaporator fluid flows and the condenser fluid flows are in opposite directions while their respective heat are being exchanged, which precisely corresponds to the optimum counter-flow heat exchange design!

Embodiments of the disclosure include a surface to volume ratio at least 600 m-1, a direct latent heat exchange or 2-phase to 2-phase heat exchange, a counter-flow heat exchange design, bulk/percolating immersion evaporation and close-loop air recirculation, as well as atmospheric pressure distillation are all included. Explanation of micro-bubble generation includes limiting the bubble sizes to mean bubble size at the bubble generation site should be less than 0.4 mm and greater than 500 nanometers, but preferably less than 0.05 mm but greater than 1 micron since nano-bubbles cost energy to make and rise way too slowly!

B) Supersaturated gases are explicitly written in the present technical disclosure. Note that compressing a saturated air (air+vapor) immediately leads to the wet air being in a supersaturated state from fundamental thermodynamics.

Counter-flow and cross-flow architectures are disclosed. Micro-bubble generator for air injection is also disclosed. A "micro-bubble-generator" includes limitations specifying that a mean bubble size should be less than 0.5 mm or so, and preferentially less than 0.1 mm, or something similar.

References may use a sparg tube to create vapor bubbles but does not constitute any equivalency to our bubble generator. A sparg tube has a simple array of orifices which would be unable to generate bubbles of extremely small sizes. According to laws of physics of micro/nano bubble generation, even for extremely small orifice diameters, the mean bubble size does not depend on the diameter of the orifices as long as they are smaller than a few tenth of a millimeters, but rather it is determined almost entirely on the balance between the surface tension of the water which acts to keep the bubble attached and the detachment forces, mostly the buoyancy force of the air bubble which tries to free the bubble from the restraining force of surface tension and other forces, if present. The bubble will detach only when the detaching forces are larger than the surface tension, and that determines the sizes of the free bubbles.

Sparg tube teachings on the other hand, do not generate miniature bubbles, but instead only average size bubbles typically having a mean diameter greater than 3 mm. It should also be noted that only micro bubbles with a diameter of less than 0.1 mm could stay small for a long time since those tiny air bubbles would acquire surface charges which gives rise to the zeta potential widely used in colloidal suspension science. Since like charges repel, such miniature bubbles would not collide and therefore can stay small.

By contrast, vapor bubbles collide often and by so doing, can grow very rapidly to large bubbles, not to mention that vapor bubbles are inherently unstable because they require a delicate balance between the vapor pressure and the local water pressure which strongly depends on the depth of water. Any pressure imbalance, such as when the vapor pressure is lower than the surrounding water pressure, would cause the vapor bubble to implode in the form of violent cavitation. Prior references count on such cavitation events similar to ones generated by strong ultrasound or rapidly revolving propeller blades in water to remove the tough scaling deposited on the tube walls. However, even though some references using vapor bubbles in a desalination device, resultant bubbles are used to descale via a compressed vapor to do so, vapor that could be used to increase the condensable vapor.

Embodiments of the disclosure use stable microscopic air bubbles to collect vapor and to facilitate bulk evaporation since the extremely large surface area relative to the volume of such air bubbles provide large interfacial boundaries between air and water for evaporation to take place even when the water temperature is nowhere near the boiling point. The air in air bubbles stabilize the vapor that is contained within, since if the vapor pressure, which is always the saturation vapor pressure which is true for any enclosed environment, is lower than the water pressure, the air within can expand/contract to adjust its partial pressure to match any pressure deficit thereof.

In embodiments of the disclosure, the very manner of operating a device has a strong bearing in terms of its physical characteristics, and in many cases, different ways of operating a device would affect its power efficiency, among other things. As an example, consider the case of a four-port heat exchanger where two different fluids are exchanging heat. In the case where the inlet ports of both fluids are on the same side, and the outlet ports of both fluids are on the other same side, then the device is considered to be an inferior co-flow heat exchanger in terms of heat exchange efficiency vs that of a counter-flow heat exchanger. The same device operates as a counter-flow heat exchanger just by reassigning the ports without ever having to make any change in the physical construction. Co-flow heat exchangers and non-counter-flow heat exchangers are considered as a basis for the improvements of the present disclosure.

Accounting for the latent heat from condensation transferred to sensible heat by raising the temperature, transferring latent heat between the input liquid and the channels via the channel walls occurs because the latent heat is transferred between the input liquid and the channels even if indirectly! High degrees of energy inefficiencies occur if the latent heat transfer is not direct.

According to processes contained in the disclosure, any time a heat transfer takes place between two items with a temperature difference, entropy production lowers the energy efficiency of the system because the transfer process is no longer thermodynamically reversible without cost. The greater the temperature difference, the larger the entropy production. This is precisely the reason why counter-flow heat exchange is the preferred process when energy efficiency is the main concern since counter-flow exchange process provides the smallest LMTD, or logarithmic mean temperature difference, which is equivalent to minimum entropy production.

Embodiments transfer the latent heat to sensible heat first, the temperature difference is raised quite drastically, since the heat flux must travel thru water in order to reach the interfacial region comprising both the air-water boundary and its immediate vicinity, heat is absorbed by the evaporation process taking place there. The corresponding temperature drop means that the heat flux would be absorbed at a point or in a tiny region where the water temperature is lowered by conduction thru water. This is the same thing as exchanging heat thru a thick wall or a thermal insulator. Water is a mild insulator because it does not conduct heat too well.

Through the micro-bubbles or very, very small bubbles of the disclosure the latent heat is transferred to the nearest interfacial surface of a bubble. The process is still not completely direct since the latent heat flux must travel thru the tube wall as well as the water that sits between the nearest wall surface and the interfacial surface. So in effect, it is still an indirect process since there are temperature drops between the point where the condensation takes place and the point where evaporation actually occurs. However, as long as the wall thickness is small and the bubble density is high and fairly uniformly distributed, the sensible heat exchange portion is minimized. So from that point of view, the disclosure is a direct latent heat exchange process.

In other embodiments, all heat conducting walls are either thin-wall metals or thin-wall plastics designed to provide a large surface-to-volume-ratio for the heat exchange channels to maximize water production in a limited space. The disclosure keeps the pressure differences between interior or exterior compartments as small as possible, which requires atmospheric operation. Further, owing to the disclosed close-loop air recirculation to introduce micro-air bubbles, an exchange of the recirculating air with outside air periodically maintains pressure balance as well as to replace or replenish air. With atmospheric operation, the disclosure performs exchange without the added cost of a blower/compressor. Therefore, atmospheric operation is part to the disclosed operation and the electrostatic precipitator and others are employed to facilitate such air exchange to avoid introducing dirty air into the disclosed system. None of these limitations are required in any reference design.

However, reference designs require strong walls for tube and tank construction which sacrifice heat exchange efficiencies since those walls need to be strong and thick metals which can withstand the large pressure difference that exist. So fundamentally, two distinct devices are distinguished unlike the case with counter-flow vs other flow heat exchangers since these exchangers may be configured with similar physical construction, where the port assignments further distinguish them.

In an embodiment, micro bubbles contain recirculated air from the condensation channels after condensation has taken place, meaning the recirculated air is collected at the bottom ends of the condensation channels where most of the vapor containing thereof has already condensed and the bubbles are primarily air bubbles of sufficiently small sizes. Otherwise a portion of the saturated gas is recirculated rather than pure compressed vapor, not saturated gases. Saturation is only meaningful when it refers to the vapor of the second liquid mixing with the first gas, or gases. Therefore, the air is saturated with water vapor, or equivalently that the relative humidity of the air is 100%.

Regarding non dirty water recirculation, the input water may be located above a filter so that the impure water flows over the filter. Input water enters a boiler above a titanium wool filter. The water that falls on the wool filter partially evaporates thru a second filter. The water that is not evaporated passes thru the filter to the brine section. The main filter is wet all the time and removes brine particles caught in the filter back to brine section. The secondary filter is supposed to catch any brine particles and force them back thru the filter to the brine section.

The most basic precipitator contains a row of thin vertical wires, followed by a stack of large flat metal plates oriented vertically, with the plates typically spaced about 1 cm to 18 cm apart, depending on the application. The air stream flows horizontally through the spaces between the wires, and then passes through the stack of plates. A negative voltage of several thousand volts is applied between wire and plate. If the applied voltage is high enough, an electric corona discharge ionizes the air around the electrodes, which then ionizes the particles in the air stream. The ionized particles, due to the electrostatic force, are diverted towards the grounded plates. Particles build up on the collection plates and are removed from the air stream.

Therefore, air stream flows horizontally thru the space between the vertical wires and the stack of metal plates with a voltage of thousands of volts to create a CORONA DISCHARGE! This distinguishes over filters mounted horizontally and the water/vapor/brine particles that travel vertically thru them. Based on horizontal flow, brines particle won't be caught and even if they did, they would not fall back to brine section. Also, water and brine particles and brine droplets are included since non-dissolved solids within input water can't really be separated from the input water and mixed with vapor during the evaporation process.

Instead, a second filter simply performs like a regular demister which removes all the entrained droplets and droplets created by splashing during the evaporation process or during initial introduction of input water thru input or during the falling of the input water thru the first filter. A demister is a must in almost all boilers/evaporators since entrained brine droplets and droplets that get carried along by the flow of the vapor or other gas is unavoidable. As such those brine particles are highly conducting contaminated drops of water which would immediately short the high voltage gaps between the wires and the plates! The corona discharge is particularly strong owing to the presence of water droplets. The discharge always takes the shortest path, which means it would jump from droplet to droplet, ionizing them at the same time. Once a plasma laden path is formed, the ions rich path further guide the electricity to travel in this highly conductive path and short the wire/plate terminals out.

C) Therefore, the disclosed Pulse Effect Distillation (PED) and counter-flow designs are distinguished over cross-flow designs as explained and shown above and in the drawings in support of the claims which immediately follow herein.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred apparatuses, methods, and systems described herein, but all those other and further alterations and modifications as would be apparent to those of ordinary skilled in the art.

What is claimed is:

1. An apparatus for generating purified liquid from an input liquid, comprising, a condensation chamber having multiple internal partition channels disposed in the input liquid, wherein the multiple internal partition channels comprise a first group of channels and a second group of channels, wherein the second group of channels are perforated to allow the input liquid to flood the second group of channels, wherein the channels of the first group and the second group of channels are interlaced such that each one of the channels of the first group is surrounded by the input liquid, and the purified liquid is outputted at a second end of the first group of the channels;

an evaporation chamber flooded with the input liquid and wherein the evaporation chamber generates saturated gases and comprises a shared wall with the condensation chamber and wherein the evaporation chamber is configured to generate evaporation cavities and condensation cavities on respective sides of the shared wall for a 2-phase counter flow of a liquid phase component and a gaseous phase component in composite flows for a 2-phase to 2-phase latent heat exchange;

a compressor operatively connected to the evaporation chamber to receive saturated gases from the evaporation chamber, wherein the compressor pressurizes the saturated gases to generate supersaturated gases, wherein the compressor is operatively connected to the first group of channels of the condensation chamber, wherein the compressor outputs the supersaturated gases to the first group of channels of the condensation chamber via a first end of the first group of the channels of the condensation chamber;

a bubble generator configured to recirculate a portion of the liquid and gases of the condensation chamber and the evaporation chamber, wherein the bubble generator is configured to permeate the input liquid with percolating gas bubbles which are adapted to form hanging micro bubbles beading right below a heat exchange surface of the evaporator chamber; and a P-trap channel comprising a first end operatively connected to the condensation chamber and a second end operatively connected to the bubble generator disposed in the evaporation chamber, wherein the P-trap channel and the bubble generator are configured to recirculate a portion of the saturated gasses from the condensation chamber to the evaporation chamber.

2. The apparatus of claim 1 wherein the walls of the channels are heat exchange walls and wherein latent heat is transferred between the input liquid and the channels via the walls of the channels and a beading of the gas bubbles on a bottom of the heat exchange walls.

3. The apparatus of claim 1 further comprising a surface to volume ratio at least 600 l/m and preferably greater than 700 l/m on the shared wall to lower the surface loading factor and minimize the temperature difference there between.

4. The apparatus of claim 1 wherein the condensation chamber, the condensation chamber, the compressor, the bubble generator and the P-trap channel comprise a closed-air closed-water HDH system.

5. The apparatus of claim 1 wherein the evaporation chamber and the condensation chamber are configured for a bulk/percolating immersion evaporation as well as an atmospheric pressure distillation via the 2-phase counter-flow design, apparatus further comprising an electrostatic precipitator to facilitate such an air exchange to avoid introducing dirty air into the disclosed system.

6. The apparatus of claim 1 further comprising a plurality of external micro-structured obstacles, external agitators and external vortex forming nozzles configured to produce micro-bubbles introduced into the evaporation chamber.

7. The apparatus of claim 1 the bubble generator and external micro bubble generation mechanisms are positioned at the end of the P-trap to generate micro bubbles as the gases are guided into the evaporation chamber.

8. The apparatus of claim 1, wherein an evaporator fluid flow and a condenser fluid flow of liquid condensate and air/vapor are configured to flow in opposite directions while their respective heat are being exchanged comprise the 2-phase counter-flow.

9. The apparatus of claim 1, further comprising a four-port counter-flow heat exchanger where fluids are exchanging heat based on an inlet port being configured on an opposite side of the apparatus relative to an outlet port of each fluid so that respective ports of each fluid are configured on opposite sides of the apparatus.

10. The apparatus of claim 1, wherein the micro bubbles generated by the bubble generator are a mean 0.4 mm in diameter.

11. The apparatus of claim 1, wherein a pressure in the condensation chamber exceeds a pressure in the evaporation chamber.

12. The apparatus of claim 1 further comprising a sediment chamber, wherein the sediment chamber is operatively connected to the evaporation chamber for allowing heavier particles in the liquid to settle in the sediment chamber.

13. The apparatus of claim 1 further comprising percolating evaporation on the evaporation chamber side via recirculating supersaturated gases or air to the evaporation chamber to enhance evaporation and latent heat recovery through percolating evaporation thus generating a 2-phase flow.

14. The apparatus of claim 13 wherein a fluid flow on the condensation chamber side is always 2-phased since it contains both the air/vapor and the condensate.

15. The apparatus of claim 1 further comprising an electrostatic precipitator operatively connected to the evaporation chamber to purify the saturated gases provided by the evaporation chamber.

16. An apparatus for generating purified liquid from an input liquid, comprising, a condensation chamber comprising an array of panels, wherein each of the panels has multiple channels aligned in a row along a respective panel, and wherein the multiple channels of the panel array comprise a first group of channels and a second group of channels, wherein the second group of channels are perforated to allow the input liquid to flood the second group of channels, wherein the channels of the first group and the second group of channels are interlaced such that each one of the channels of the first group is surrounded by the input liquid, and the purified liquid is outputted at a second end of the first group of the channels;

a compressor having an inlet and an outlet, wherein the compressor is operatively connected to the evaporation chamber to receive saturated gases from the evaporation chamber, wherein the compressor is operatively connected to the first group of channels of the condensation chamber, wherein the compressor outputs supersaturated gases from a pressurization of the saturated gases to the first group of channels of the condensation chamber via a first end of the first group of the channels of the condensation chamber, wherein the saturated gases are generated from the input liquid, wherein the compressor pressurizes the saturated gases to generate supersaturated gases, wherein the supersaturated gases are expelled to a first end of the channels via the outlet, wherein the purified liquid is outputted at a second end of the first group of the channels, wherein a plurality of walls of the channels are heat exchange walls, and wherein latent heat is transferred between the input liquid and the channels via the walls of the channels;

an evaporation chamber flooded with the input liquid and wherein the evaporation chamber generates saturated gases and comprises a shared wall with the condensation chamber and wherein the evaporation chamber is configured to generate evaporation cavities and condensation cavities on respective sides of the shared wall for a 2-phase counter flow of a liquid phase component and a gaseous phase component in composite flows for a 2-phase to 2-phase latent heat exchange;

a micro bubble generator configured to recirculate a portion of the liquid and gases of the condensation chamber and the evaporation chamber, wherein the bubble generator is configured to permeate the input liquid with percolating gas bubbles which are adapted to form hanging bubbles beading right below a heat exchange surface of the evaporator chamber; and a P-trap channel comprising a first end operatively connected to the condensation chamber and a second end operatively connected to the bubble generator disposed in the evaporation chamber, wherein the P-trap channel and the bubble generator are configured to recirculate a portion of the saturated gasses from the condensation chamber to the evaporation chamber.

17. The apparatus of claim 16 further comprising,
a sediment chamber operatively connected to the evaporation chamber; and
an electrostatic precipitator to purify the saturated gases operatively connected to the evaporation chamber,
wherein ends of the second group of the channels are sealed to prevent the input liquid from flooding the the first group of the channels,
wherein the channels are substantially aligned in a horizontal direction,
wherein the P-trap channel connects the evaporation chamber to the condensation chamber,
wherein the pressure in the condensation chamber exceeds the pressure in the evaporation chamber,
wherein the sediment chamber is connected to the evaporation chamber for allowing heavier particles in the liquid to settle in the sediment chamber,
wherein the sediment chamber has a digitally controlled pump for pumping the particles from the sediment chamber, and
wherein the sediment chamber has various interconnected levels to allow for different particle concentrations at each of the interconnected levels.

18. An apparatus for generating purified liquid from an input liquid, comprising,
a condensation chamber comprising multiple channels, wherein the channels are tubes, wherein the multiple channels comprise a first group of channels and a second group of channels, wherein the second group of channels are perforated to allow the input liquid to flood the second group of channels, wherein the channels of the first group and the second group of channels are interlaced such that each one of the channels of the first group is surrounded by the input liquid, and the purified liquid is outputted at a second end of the first group of the channels;
an evaporation chamber flooded with the input liquid and wherein the evaporation chamber generates saturated gases and comprises a shared wall with the condensation chamber and wherein the evaporation chamber is configured to generate evaporation cavities and condensation cavities on respective sides of the shared wall for a 2-phase counter flow of a liquid phase component and a gaseous phase component in composite flows for a 2-phase to 2-phase latent heat exchange;
a compressor having an inlet and an outlet, wherein the compressor is operatively connected to the evaporation chamber to receive saturated gases from the evaporation chamber, wherein the compressor is operatively connected to a first group of channels of the condensation chamber, wherein the compressor outputs supersaturated gases to the first group of channels of the condensation chamber via a first end of the first group of the channels of the condensation chamber,
wherein the channels are submerged in the input liquid,
wherein the saturated gases are generated from the input liquid,
wherein the compressor receives the saturated gases via the inlet,
wherein the compressor pressurizes the saturated gases to generate supersaturated gasses,
wherein the supersaturated gases are expelled to a first end of the first group of the channels via the outlet,
wherein the purified liquid is outputted at a second end of the channels,
wherein a plurality of the walls of the first group of channels are heat exchange walls,
wherein latent heat is transferred between the input liquid and the channels via the walls of the channels,
wherein the tubes each have spacers,
wherein the tubes are grouped together, and
wherein the input liquid flows in between the tubes; and
a micro bubble generator configured to recirculate a portion of the liquid and gases of the condensation chamber and the evaporation chamber, wherein the bubble generator is configured to permeate the input liquid with percolating gas bubbles which are adapted to form hanging bubbles beading right below a heat exchange surface of the evaporator chamber; and
a P-trap channel comprising a first end operatively connected to the condensation chamber and a second end operatively connected to the bubble generator disposed in the evaporation chamber, wherein the P-trap channel and the bubble generator are configured to recirculate a portion of the saturated gasses from the condensation chamber to the evaporation chamber.

19. The apparatus of claim 18 further comprising,
a P-trap channel operatively connected to the evaporation chamber and to the condensation chamber for recirculating the portion of the saturated gases;
a sediment chamber operatively connected to the evaporation chamber; and
an electrostatic precipitator operatively connected to the evaporation chamber to purify the saturated gases provided by the evaporation chamber,
wherein a radial center of each of the tubes are equidistant to the radial center of adjacent tubes,
wherein the channels are substantially aligned in a horizontal direction,
wherein a portion of the saturated gases in the condensation chamber are recirculated via a bubble generation mechanism to the evaporation chamber,
wherein the P-trap channel connects the evaporation chamber to the condensation chamber,
wherein the pressure in the condensation chamber exceeds the pressure in the evaporation chamber,
wherein the sediment chamber is connected to the evaporation chamber for allowing heavier particles in the liquid to settle in the sediment chamber,
wherein the sediment chamber having a digitally controlled pump for pumping the particles from the sediment chamber, and
wherein the sediment chamber has various interconnected levels to allow for different particle concentrations at each of the interconnected levels.

* * * * *